United States Patent
Naya et al.

(10) Patent No.: US 11,432,179 B2
(45) Date of Patent: Aug. 30, 2022

(54) ENVIRONMENT INFORMATION ACQUISITION METHOD, ENVIRONMENT INFORMATION ACQUISITION APPARATUS AND ENVIRONMENT INFORMATION ACQUISITION SYSTEM

(71) Applicant: NIPPON TELEGRAPH AND TELEPHONE CORPORATION, Tokyo (JP)

(72) Inventors: Maiko Naya, Tokyo (JP); Kenji Shimizu, Tokyo (JP); Takahiro Yamazaki, Tokyo (JP); Atsushi Taniguchi, Tokyo (JP); Yohei Katayama, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 39 days.

(21) Appl. No.: 17/045,707

(22) PCT Filed: Apr. 4, 2019

(86) PCT No.: PCT/JP2019/014967
§ 371 (c)(1),
(2) Date: Oct. 6, 2020

(87) PCT Pub. No.: WO2019/203009
PCT Pub. Date: Oct. 24, 2019

(65) Prior Publication Data
US 2021/0092628 A1  Mar. 25, 2021

(30) Foreign Application Priority Data
Apr. 16, 2018 (JP) .............................. JP2018-078721

(51) Int. Cl.
*H04B 17/24* (2015.01)
*H04B 17/26* (2015.01)
(Continued)

(52) U.S. Cl.
CPC ............ *H04W 24/10* (2013.01); *H04B 17/24* (2015.01); *H04B 17/26* (2015.01); *H04B 17/29* (2015.01);
(Continued)

(58) Field of Classification Search
CPC .......... H04B 17/0082–3913; H04W 16/02–32; H04W 24/02–10; H04W 28/02–26;
(Continued)

(56) References Cited

U.S. PATENT DOCUMENTS

2004/0203727 A1* 10/2004 Abiri ...................... H04W 16/18
2016/0262060 A1   9/2016 Nunokawa et al.
(Continued)

FOREIGN PATENT DOCUMENTS

| JP | 2008306240 A | * 12/2008 | ............ H04W 24/02 |
| JP | 2013239967 A | * 11/2013 | ............ H04W 24/02 |
| JP | 2016165093 A | *  9/2016 | ............ H04W 24/02 |

OTHER PUBLICATIONS

Yamazaki et al., Integrated Management Architecture of Future IoT Wireless Access Systems-Wireless Access Virtualization-, IEICE Technical Report, vol. 116, No. 508, MoNA2016-48, pp. 309-314, Mar. 2017.
(Continued)

*Primary Examiner* — Timothy J Weidner
(74) *Attorney, Agent, or Firm* — Harness, Dickey & Pierce, P.L.C.

(57) ABSTRACT

An environmental information acquisition method is performed by an environmental information acquisition apparatus that acquires a measurement result of a radio wave
(Continued)

environment. The environmental information acquisition method includes distributing software of each radio scheme to one or more base station apparatuses measuring a radio wave environment of the radio scheme based on the software of the radio scheme, instructing the one or more base station apparatuses to measure the radio wave environment, and acquiring the measurement result of the radio wave environment from the one or more base station apparatuses measuring based on the software the radio wave environment in multiple sections set across an area.

18 Claims, 20 Drawing Sheets

(51) Int. Cl.
| | |
|---|---|
| H04B 17/29 | (2015.01) |
| H04B 17/309 | (2015.01) |
| H04B 17/373 | (2015.01) |
| H04B 17/391 | (2015.01) |
| H04W 16/18 | (2009.01) |
| H04W 16/22 | (2009.01) |
| H04W 24/02 | (2009.01) |
| H04W 24/10 | (2009.01) |
| H04W 84/04 | (2009.01) |
| H04W 84/10 | (2009.01) |
| H04W 88/10 | (2009.01) |
| H04W 88/12 | (2009.01) |
| H04W 88/18 | (2009.01) |
| H04W 92/02 | (2009.01) |
| H04W 92/12 | (2009.01) |
| H04W 92/20 | (2009.01) |

(52) U.S. Cl.
CPC ......... *H04B 17/309* (2015.01); *H04B 17/373* (2015.01); *H04B 17/3913* (2015.01); *H04W 16/18* (2013.01); *H04W 16/22* (2013.01); *H04W 24/02* (2013.01); *H04W 84/04* (2013.01); *H04W 84/10* (2013.01); *H04W 88/10* (2013.01); *H04W 88/12* (2013.01); *H04W 88/18* (2013.01); *H04W 92/02* (2013.01); *H04W 92/12* (2013.01); *H04W 92/20* (2013.01)

(58) Field of Classification Search
CPC . H04W 48/02–20; H04W 64/003–006; H04W 72/005–14; H04W 84/005–22; H04W 88/005–188; H04W 92/02–24
See application file for complete search history.

(56) References Cited

U.S. PATENT DOCUMENTS

2016/0337099 A1\* 11/2016 Chai .................... H04W 76/15
2017/0201891 A1\* 7/2017 Tarlazzi ................ H04W 24/02

OTHER PUBLICATIONS

Taoka et al., MIMO and CoMP in LTE-Advanced, NTT DOCOMO Technical Journal, vol. 18, No. 2, pp. 22-30, 2010.

\* cited by examiner

| BASE-STATION APPARATUS IDENTIFICATION INFORMATION | POSITION (x, y) | MOUNTED RADIO SCHEME | OPERATION INFORMATION | OPERATING RADIO SCHEME (CH) | MEASUREMENT AVAILABILITY |
|---|---|---|---|---|---|
| 2-1 | (1, 1) | A, C | DEACTIVATION | - | AVAILABLE |
| 2-2 | (3, 1) | C, D | OPERATION | D (2) | NOT AVAILABLE |
| 2-3 | (1, 3) | B | DEACTIVATION | - | AVAILABLE |
| 2-4 | (3, 3) | A, D | DEACTIVATION | - | AVAILABLE |

| NOT-MEASURED SECTION NUMBER | SECTION BOUNDARY COORDINATES | CANDIDATE | BASE STATION APPARATUS THAT PERFORMS MEASUREMENT | ASSIGNMENT FLAG |
|---|---|---|---|---|
| ⋮ | ⋮ | ⋮ | ⋮ | ⋮ |
| 15 | (1,2)(2,2)(1,3)(2,3) | 2-2, 2-3 | NONE | NOT |
| ⋮ | ⋮ | ⋮ | ⋮ | ⋮ |
| 17 | (2,1)(3,1)(2,2)(3,2) | 2-2 | NONE | NOT |
| ⋮ | ⋮ | ⋮ | ⋮ | ⋮ |
| 44 | (0,3)(1,3)(0,4)(1,4) | 2-3 | NONE | NOT |
| ⋮ | ⋮ | ⋮ | ⋮ | ⋮ |

Fig. 17

| NOT-MEASURED SECTION NUMBER | SECTION BOUNDARY COORDINATES | CANDIDATE | BASE STATION APPARATUS THAT PERFORMS MEASUREMENT | ASSIGNMENT FLAG |
|---|---|---|---|---|
| ... | ... | ... | ... | ... |
| 15 | (1,2)(2,2)(1,3)(2,3) | 2-2, 2-3 | NONE | - |
| ... | ... | ... | ... | ... |
| 17 | (2,1)(3,1)(2,2)(3,2) | 2-2 | 2-2 | COMPLETE |
| ... | ... | ... | ... | ... |
| 44 | (0,3)(1,3)(0,4)(1,4) | 2-3 | 2-3 | COMPLETE |
| ... | ... | ... | ... | ... |

Fig. 18

| NOT-MEASURED SECTION NUMBER | SECTION BOUNDARY COORDINATES | CANDIDATE | BASE STATION APPARATUS THAT PERFORMS MEASUREMENT | ASSIGNMENT FLAG |
|---|---|---|---|---|
| ⋮ | ⋮ | ⋮ | ⋮ | ⋮ |
| 15 | (1,2)(2,2)(1,3)(2,3) | 2-2, 2-3 | 2-2 | COMPLETE |
| ⋮ | ⋮ | ⋮ | ⋮ | ⋮ |
| 17 | (2,1)(3,1)(2,2)(3,2) | 2-2 | 2-2 | COMPLETE |
| ⋮ | ⋮ | ⋮ | ⋮ | ⋮ |
| 44 | (0,3)(1,3)(0,4)(1,4) | 2-3 | 2-3 | COMPLETE |
| ⋮ | ⋮ | ⋮ | ⋮ | ⋮ |

Fig. 19

| NOT-MEASURED SECTION NUMBER | SECTION BOUNDARY COORDINATES | CANDIDATE | BASE STATION APPARATUS THAT PERFORMS MEASUREMENT | ASSIGNMENT FLAG |
|---|---|---|---|---|
| ... | ... | ... | ... | ... |
| 15 | (1,2)(2,2)(1,3)(2,3) | 2-2, 2-3 | 2-3 | COMPLETE |
| ... | ... | ... | ... | ... |
| 17 | (2,1)(3,1)(2,2)(3,2) | 2-2 | 2-2 | COMPLETE |
| ... | ... | ... | ... | ... |

Fig. 23

ENVIRONMENT INFORMATION ACQUISITION METHOD, ENVIRONMENT INFORMATION ACQUISITION APPARATUS AND ENVIRONMENT INFORMATION ACQUISITION SYSTEM

CROSS-REFERENCE TO RELATED APPLICATIONS

This application is a 371 National Stage of International Application No. PCT/JP2019/014967, filed on Apr. 4, 2019, which claims priority to Japanese Patent Application No. 2018-078721, filed Apr. 16, 2018. The entire disclosures of the above applications are incorporated herein by reference.

TECHNICAL FIELD

The present disclosure relates to an environmental information acquisition method, an environmental information acquisition apparatus, and an environmental information acquisition system.

BACKGROUND ART

A base station apparatus (software radio platform) that communicates with a terminal in a radio scheme by switching software for each radio scheme has been studied and proposed (see Non-Patent Literature 1). Each terminal uses an individual communication service at various times and locations. For this reason, a base station apparatus installs on itself software suitable for the radio scheme to be used by the terminal at the time when the terminal uses the communication service. Thus, the base station apparatus can efficiently use hardware resources of the base station apparatus and frequency resources.

For each communication service, communication quality (QoS: Quality of Service) required for the communication service is defined. Thus, the base station apparatus needs to install software of a radio scheme capable of satisfying communication quality required for the communication service. Because a radio wave environment such as a reception radio field intensity changes depending on the movement of the terminal, and also the movement and fluctuation of the surrounding object, the base station apparatus needs to not only install software based on specification information (e. g., transmission speed, transmission delay time) of the radio scheme, but also to communicate in accordance with a radio wave environment in an area where the communication service is provided.

Non-Patent Literature 2 discloses a method for acquiring radio wave environmental information using a Long Term Evolution (LTE) reference signal (see Non-Patent Literature 2). One or more base station apparatuses arranged in an area where the communication service is provided need to acquire radio wave environmental information for each section set across the area so as to cover the entire area. In the known technologies, a measurer relocates to each section set across the area, and measures a radio wave environment of each section using a measuring instrument. Thus, efficiency of acquiring radio wave environmental information is low. Additionally, in the known technologies, in order to complete the measurement in a small amount of time, more dedicated measuring instruments are needed, and thus the cost for the measurement gets high.

CITATION LIST

Non Patent Literature

Non-Patent Literature 1: Yamazaki and three others, "Integrated Management Architecture of Future IoT Wireless Access Systems—Wireless Access Virtualization", IEICE Technical Report, vol. 116, no. 508, MoNA2016-48, pp. 309-314, March 2017.
Non-Patent Literature 2: Taoka, and four others, "MIMO and Inter-Cell Cooperative Transmission/Reception Technology in LTE-Advanced", NTT DOCOMO Technical Journal, Vol. 18, no. 2, pp. 22-30, June 2010

SUMMARY OF THE INVENTION

Technical Problem

Availability of the frequency resources and the hardware resources of the base station apparatuses is finite. Thus, the environmental information acquisition system needs to efficiently acquire radio wave environmental information using one or more base station apparatuses disposed in an area as if to cover the entire area. However, in the known environmental information acquisition systems, it may not be possible to improve the efficiency of acquiring the radio wave environmental information to cover the entire area.

To consider the above circumstances, an object of the present disclosure is to provide an environmental information acquisition method, an environmental information acquisition apparatus, and an environmental information acquisition system, in which it is possible to improve efficiency of acquiring radio wave environmental information so as to cover the entire area.

Means for Solving the Problem

According to an aspect of the present disclosure, an environmental information acquisition method is executed by an environmental information acquisition apparatus for acquiring a measurement result of a radio wave environment. The environmental information acquisition method includes distributing software to one or more base station apparatuses measuring based on the software according to radio scheme a radio wave environment of each radio scheme, instructing the one or more base station apparatuses to measure the radio wave environment, and acquiring the measurement result of the radio wave environment from the one or more base station apparatuses measuring the radio wave environment based on the software in multiple sections set across an entire area.

According to the aspect of the present disclosure, the environmental information acquisition method further includes, based on a relation between a number of the base station apparatuses and a measuring time of the radio wave environment in case accuracy of a measurement, which is the accuracy of the measurement result, reaches equal to or greater than a threshold value, generating information indicating a maximum number of the base station apparatuses capable of measuring the radio wave environment and information indicating the measuring time. In the instructing, the one or more base station apparatuses selected based on the information indicating the maximum number of the base station apparatuses capable of measuring the radio wave environment is instructed to measure the radio wave environment. In the acquiring, the measurement result of the radio wave environment obtained over the measurement in the multiple sections is acquired from the selected one or more base station apparatuses.

According to the aspect of the present disclosure, the environmental information acquisition method further includes estimating the radio wave environment in the section where the radio wave environment is not measured based on a time correlation or spatial correlation of the radio wave environment. In the acquiring, a measurement result of the radio wave environment in the section where the radio wave environment is not estimated in the estimating is acquired from the base station apparatus measuring the radio wave environment in the section.

According to the aspect of the present disclosure, the environmental information acquisition method further includes assigning preferentially a base station apparatus capable of measuring the radio wave environment for a small number of times in multiple sections where the radio wave environment is not measured to a measurement of the radio wave environment in the multiple sections.

According to the aspect of the present disclosure, the environmental information acquisition method further includes assigning preferentially a base station apparatus having a short distance from the section where the radio wave environment is not measured to a measurement of the radio wave environment in the section where the radio wave environment is not measured.

According to the aspect of the present disclosure, in the environmental information acquisition method, in case a plurality of base station apparatuses having an equal distance from the section where the radio wave environment is not measured exist, the assigning unit assigns preferentially a base station apparatus having a short operation time or low traffic to a measurement of the radio wave environment in the section where the radio wave environment is not measured.

According to another aspect of the present disclosure, an environmental information acquisition apparatus includes a distribution unit configured to distribute software to one or more base station apparatuses measuring based on the software according to radio scheme a radio wave environment of each radio scheme of the wireless system, an instruction unit configured to instruct the one or more base station apparatuses to measure the radio wave environment, and an acquisition unit configured to acquire the measurement result of the radio wave environment from the one or more base station apparatuses that measure the radio wave environment based on the software in multiple sections set across an area.

According to the aspect of the present disclosure, the environmental information acquisition apparatus further includes, based on a relation between a number of the base station apparatuses and a measuring time of the radio wave environment in case accuracy of a measurement, which is the accuracy of the measurement result, reaches equal to or greater than a threshold value, a generation unit configured to generate information indicating a maximum number of the base station apparatuses capable of measuring the radio wave environment and information indicating the measuring time. The instruction unit instructs the one or more base station apparatuses selected based on the information indicating the maximum number of the base station apparatuses capable of measuring the radio wave environment, to measure the radio wave environment. The acquisition unit acquires the measurement result of the radio wave environment obtained over the measuring time in the multiple sections from the selected one or more base station apparatuses.

According to the aspect of the present disclosure, the environmental information acquisition apparatus further includes an estimation unit configured to estimate the radio wave environment in the section where the radio wave environment is not measured, based on a time correlation or spatial correlation of the radio wave environment. The acquisition unit acquires a measurement result of the radio wave environment in the section where the radio wave environment is not estimated by the estimation unit, from the base station apparatus measuring the radio wave environment in the section.

According to the aspect of the present disclosure, the environmental information acquisition apparatus further includes an assigning unit configured to assign preferentially a base station apparatus capable of measuring the radio wave environment for a small number of times in multiple sections where the radio wave environment is not measured to a measurement of the radio wave environment in the multiple sections.

According to the aspect of the present disclosure, the environmental information acquisition apparatus further includes an assigning unit configured to assign preferentially a base station apparatus having a short distance from the section where the radio wave environment is not measured, to measurement of the radio wave environment in the section where the radio wave environment is not measured.

According to the aspect of the present disclosure, in the environmental information acquisition apparatus, in case a plurality of base station apparatuses having an equal distance from the section where the radio wave environment is not measured exist, the assigning unit assigns preferentially a base station apparatus having a short operation time or low traffic to a measurement of the radio wave environment in the section where the radio wave environment is not measured.

According to yet another aspect of the present disclosure, an environmental information acquisition system includes one or more base station apparatuses including a base-station control unit configured to measure a radio wave environment of a radio scheme based on software according to each radio scheme, and an environmental information acquisition apparatus including a distribution unit configured to distribute the software to the base station apparatus, an instruction unit configured to instruct the one or more base station apparatuses to measure the radio wave environment, and an acquisition unit configured to acquire the measurement result of the radio wave environment from the one or more base station apparatuses measuring the radio wave environment based on the software in multiple sections set across an area.

According to the aspect of the present disclosure, the environmental information acquisition system further includes, based on a relation between a number of the base station apparatuses and a measuring time of the radio wave environment in case accuracy of a measurement, which is the accuracy of the measurement result, reaches equal to or greater than a threshold value, a generation unit configured to generate information indicating a maximum number of the base station apparatuses capable of measuring the radio wave environment and information indicating the measuring time. The instruction unit instructs the one or more base station apparatuses selected based on the information indicating the maximum number of the base station apparatuses capable of measuring the radio wave environment, to measure the radio wave environment. The acquisition unit acquires the measurement result of the radio wave environment obtained over the measuring time in the multiple sections from the selected one or more base station apparatuses.

According to the aspect of the present disclosure, the environmental information acquisition system further includes an estimation unit configured to estimate the radio wave environment in the section where the radio wave environment is not measured, based on a time correlation or spatial correlation of the radio wave environment. The acquisition unit acquires the measurement result of the radio wave environment in the section where the radio wave environment is not estimated by the estimation unit, from the base station apparatus measuring the radio wave environment in the section.

According to the aspect of the present disclosure, in the environmental information acquisition system, the environmental information acquisition apparatus includes an assigning unit configured to assign preferentially a base station apparatus capable of measuring the radio wave environment for a small number of times in multiple in multiple sections where the radio wave environment is not measured to a measurement of the radio wave environment in the multiple sections.

According to the aspect of the present disclosure, in the environmental information acquisition system, the environmental information acquisition apparatus includes an assigning unit configured to assign preferentially a base station apparatus having a short distance from the section where the radio wave environment is not measured, to measurement of the radio wave environment in the section where the radio wave environment is not measured.

According to the aspect of the present disclosure, in the environmental information acquisition system, in case a plurality of base station apparatuses having an equal distance from the section where the radio wave environment is not measured exist, the assigning unit preferentially assigns a base station apparatus having a short operation time or low traffic, to measurement of the radio wave environment in the section where the radio wave environment is not measured.

Effects of the Invention

According to the present disclosure, it is possible to improve the efficiency of acquiring radio wave environmental information to cover the entire area.

BRIEF DESCRIPTION OF DRAWINGS

FIG. 17 is a diagram illustrating a first example of an assignment information table in the third embodiment.

FIG. 18 is a diagram illustrating a second example of the assignment information table in the third embodiment.

FIG. 19 is a diagram illustrating a third example of the assignment information table in the third embodiment.

FIG. 23 is a diagram illustrating an example of an assignment information table in the fourth embodiment.

DESCRIPTION OF EMBODIMENTS

Embodiments of the present disclosure will be described with reference to the drawings.

First Embodiment

Figure 1:
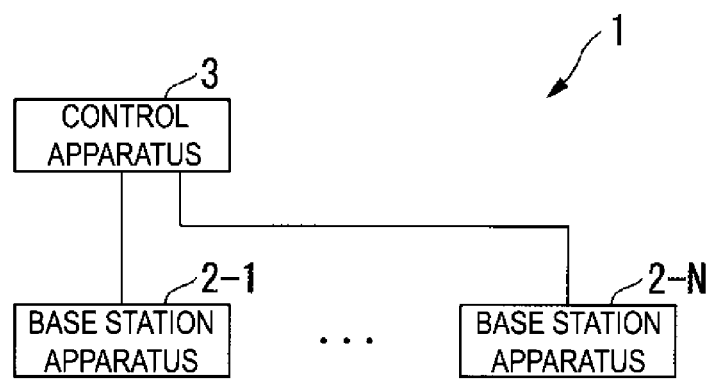
FIG. 1 is a diagram illustrating an example of a configuration of an environmental information acquisition system according to a first embodiment.

FIG. 1 is a diagram illustrating an example of a configuration of an environmental (environment) information acquisition system 1. The environmental information acquisition system 1 is a system that acquires radio wave environmental information in an area where a communication service is provided.

The environmental information acquisition system 1 acquires radio wave environmental information to cover the entire area. The environmental information acquisition system 1 measures a radio wave environment of each radio scheme for each section defined in the entire area. The radio wave environment means information and features which can be measured for radio wave propagation. For example, the radio wave environment means reception radio wave intensity or a radio wave interference amount.

The environmental information acquisition system 1 includes base station apparatuses 2-1 to 2-N (N is an integer of 1 or greater) and a control apparatus 3. In one example, N is 4 in the following description. In the following description, items common between the base station apparatuses 2-1 to 2-N are described as "the base station apparatus 2" by omitting a portion of the reference sign.

The base station apparatus 2 is a radio communication apparatus. For example, the base station apparatus 2 is an access point corresponding to Software Defined Radio (SDR). An example of the radio scheme handled by the base station apparatus 2 is a wireless communication system to which a plurality of service providers require correspondence. Examples of the radio scheme include 802.11ac, 802.11ah, ZigBee (registered trademark), and Wi-SUN. The base station apparatus 2 communicates with a terminal by wireless processing by software. The base station apparatus 2 may communicate with the terminal by wireless processing by hardware.

Figure 2:
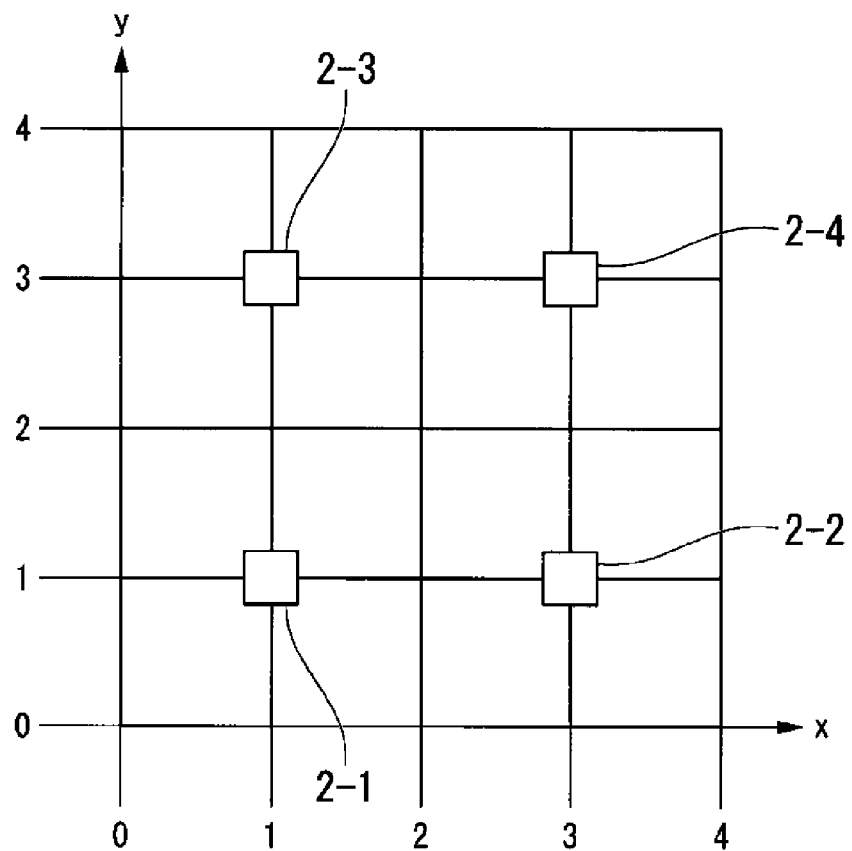
FIG. 2 is a diagram illustrating an example of an arrangement of a base station apparatus in the first embodiment.

FIG. 2 is a diagram illustrating an example of the arrangement of the base station apparatus 2. The area is divided into multiple sections. In FIG. 2, the base station apparatus 2-1 is disposed at a position of (x, y)=(1,1).

The base station apparatus 2-2 is disposed at a position of (x, y)=(3,1). The base station apparatus 2-3 is disposed at a position of (x, y)=(1,3). The base station apparatus 2-4 is disposed at a position of (x, y)=(3,3).

For the radio scheme for which an instruction is received from the control apparatus 3, the base station apparatus 2 measures a radio wave environment such as reception radio wave intensity and a radio wave interference amount, for each section. In a first embodiment, the base station apparatus 2 measures the radio wave environment in all sections defined in the area. Thus, the base station apparatus 2 may acquire radio wave environmental information to cover the entire area.

The control apparatus 3 is an information processing apparatus such as a server apparatus. The control apparatus 3 controls the base station apparatus 2. In a case where software of a radio scheme to be used by a terminal has been already installed on one or more base station apparatuses 2, the terminal can communicate with at least one or more base station apparatuses 2 among the above base station apparatuses. The control apparatus 3 determines whether the software of the radio scheme to be used by the terminal is installed on the base station apparatus 2. In a case where the software of the radio scheme to be used by the terminal is not installed on the base station apparatus 2, the control apparatus 3 transmits the software of the radio scheme used by the terminal to the base station apparatus 2. In a case where a predetermined condition is established, the control apparatus 3 may transmit the software of the radio scheme to be used by the terminal, to the base station apparatus 2. Examples of the predetermined condition include a condition that a measuring time is the minimum, a condition that the number of base station apparatuses 2 to be used is the smallest, and a condition that the amount of the software changed by the base station apparatus 2 is the smallest. Priorities may be defined for the conditions depending on which condition is prioritized.

The control apparatus 3 selects one or more base station apparatuses 2 that measure the radio wave environment from the base station apparatuses 2-1 to 2-4. The control apparatus 3 instructs one or more selected base station apparatuses 2, of the radio scheme to be used by the base station apparatus 2 in a case of measuring the radio wave environment. The control apparatus 3 determines a time range in which the selected base station apparatus 2 measures the radio wave environment. The control apparatus 3 transmits information indicating a schedule for measuring the radio wave environment (referred to as "measurement schedule information" below), to the selected base station apparatus 2.

The measurement schedule information includes information indicating the radio scheme to be used by the base station apparatus 2 in a case of measuring the radio wave environment, information indicating a time range in which the base station apparatus 2 performs measurements, and information indicating a section as a measurement target. The control apparatus 3 acquires, for each section, a measurement result of the radio wave environment from the base station apparatus 2 that has measured the radio wave environment based on the measurement schedule information.

Figure 3:
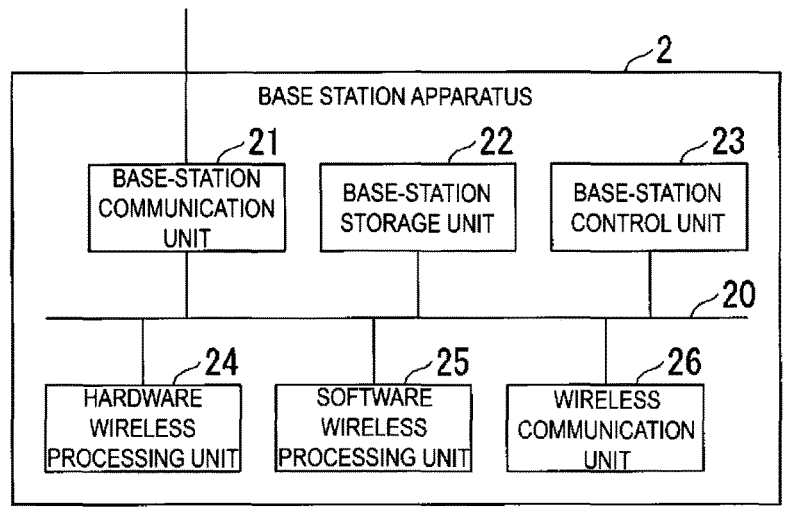
FIG. 3 is a diagram illustrating an example of a configuration of the base station apparatus in the first embodiment.

Next, an example of the configuration of the base station apparatus 2 will be described. FIG. 3 is a diagram illustrating an example of the configuration of the base station apparatus 2. The base station apparatus 2 includes a bus 20, a base-station communication unit 21, a base-station storage unit 22, a base-station control unit 23, a hardware wireless processing unit 24, a software wireless processing unit 25, and a wireless communication unit 26. The bus 20 transfers data in the base station apparatus 2.

The base-station communication unit 21, the base-station control unit 23, and the software wireless processing unit 25 are implemented in a manner that a processor such as a Central Processing Unit (CPU) executes software stored in the base-station storage unit 22. The hardware wireless processing unit 24 and the wireless communication unit 26 are implemented using hardware such as a Large Scale Integration (LSI) or an Application Specific Integrated Circuit (ASIC), for example.

The base-station communication unit 21 communicates with the control apparatus 3 by wired or wireless communication based on a predetermined protocol. The base-station communication unit 21 records software received from the control apparatus 3, in the base-station storage unit 22 for each radio scheme. The base-station communication unit 21 outputs an instruction signal received from the control apparatus 3, to the base-station control unit 23.

The base-station storage unit 22 is a non-volatile storage device (non-transitory computer readable medium) such as a flash memory. The base-station storage unit 22 may further include a volatile recording medium such as a Random Access Memory (RAM). The base-station storage unit 22 stores software of the radio scheme to be used by the terminal communicating with the base station apparatus 2. The software of each radio scheme is used for measuring the radio wave environment in each radio scheme.

The base-station control unit 23 acquires parameter information corresponding to the radio wave environment, from at least one of the hardware wireless processing unit 24 and the software wireless processing unit 25. The base-station control unit 23 measures the radio wave environment of the radio scheme used for the measurement, based on the parameter information corresponding to the radio wave environment, for each section.

The hardware wireless processing unit 24 performs wireless processing using hardware of each radio scheme. For example, the hardware wireless processing unit 24 generates a baseband signal of each radio scheme based on a control signal acquired from the base-station control unit 23. The hardware wireless processing unit 24 outputs the generated baseband signal to the wireless communication unit 26.

The hardware wireless processing unit 24 acquires the baseband signal from the wireless communication unit 26. The hardware wireless processing unit 24 generates parameter information corresponding to the radio wave environment, based on a value or the like indicated by the acquired baseband signal. The hardware wireless processing unit 24 outputs the parameter information corresponding to the radio wave environment, to the base-station control unit 23.

The software wireless processing unit 25 performs wireless processing based on software of each radio scheme. For example, the software wireless processing unit 25 generates a baseband signal of each radio scheme based on a control signal acquired from the base-station control unit 23. The software wireless processing unit 25 outputs the generated baseband signal to the wireless communication unit 26.

The software wireless processing unit 25 acquires the baseband signal from the wireless communication unit 26. The software wireless processing unit 25 generates parameter information corresponding to the radio wave environment, based on a value or the like indicated by the acquired baseband signal. The software wireless processing unit 25 outputs the parameter information corresponding to the radio wave environment, to the base-station control unit 23.

The wireless communication unit 26 acquires the baseband signal of each radio scheme from at least one of the hardware wireless processing unit 24 and the software wireless processing unit 25. The wireless communication unit 26 performs modulation processing on the baseband signal of each radio scheme. The wireless communication unit 26 transmits a wireless signal generated as a result of the modulation processing, to a terminal or the like located in the section defined in the area.

The wireless communication unit 26 performs demodulation processing on the wireless signal received from the terminal or the like located in the section defined in the area. The wireless communication unit 26 outputs a baseband signal generated as a result of the demodulation processing, to at least one of the hardware wireless processing unit 24 and the software wireless processing unit 25.

Figure 4:
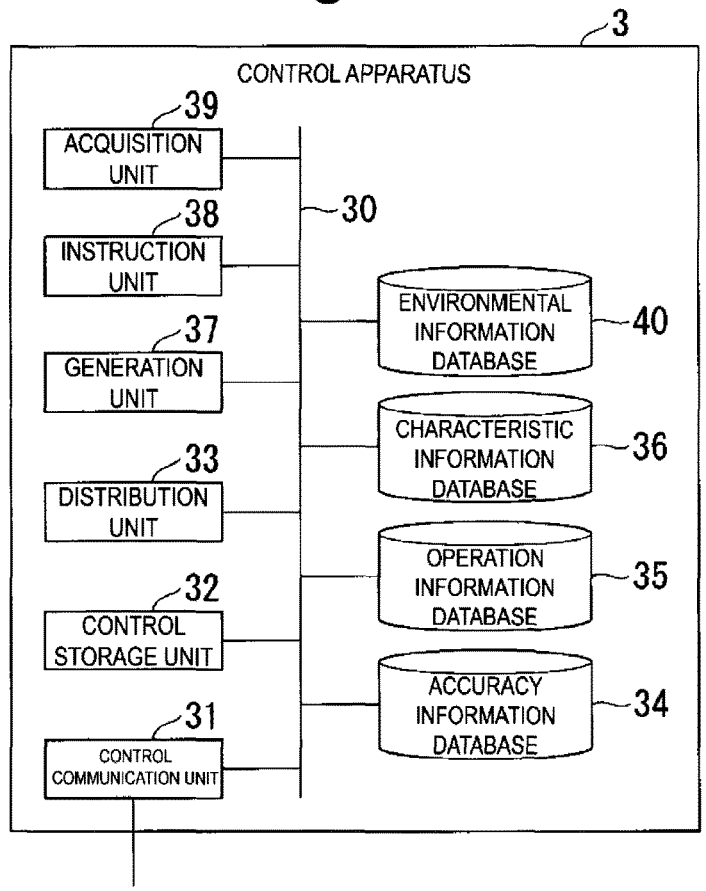
FIG. 4 is a diagram illustrating an example of a configuration of a control apparatus in the first embodiment.

Next, an example of the configuration of the control apparatus 3 will be described. FIG. 4 is a diagram illustrating an example of the configuration of the control apparatus 3. The control apparatus 3 includes a bus 30, a control communication unit 31, a control storage unit 32, a transmission unit 33, an accuracy information database 34, an operation information database 35, a characteristic information database 36, a generation unit 37, an instruction unit 38, an acquisition unit 39, and an environmental information database 40. The bus 30 transfers data in the control apparatus 3.

The control communication unit 31, the transmission unit 33, the generation unit 37, the instruction unit 38, and the acquisition unit 39 are implemented in a manner that a processor such as a CPU executes software stored in the control storage unit 32. The functional units may be implemented, for example, using hardware such as an LSI and an ASIC.

The control storage unit 32, the accuracy information database 34, the operation information database 35, the characteristic information database 36, and the environmental information database 40 are non-volatile storage devices (non-transitory computer readable media) such as flash memory. The storage units may further include volatile recording media such as RAMS.

The control communication unit 31 transmits measurement schedule information to one or more base station apparatuses 2 selected by the instruction unit 38. The control communication unit 31 acquires a measurement result of the radio wave environment of each section from the one or more base station apparatuses 2 that have measured the radio wave environment based on the measurement schedule information. The control communication unit 31 outputs the measurement result of the radio wave environment of each section to the acquisition unit 39.

The control storage unit 32 stores software executed by the control communication unit 31. The control storage unit 32 stores software distributed by the distribution unit 33 to the base station apparatus 2, for each radio scheme.

The distribution unit 33 distributes software to the one or more base station apparatuses 2 that measure the radio wave environment of each radio scheme based on software of each radio scheme, through the control communication unit 31.

The accuracy information database 34 stores information indicating measurement accuracy required to satisfy communication quality required by a communication service. The measurement accuracy is predetermined for each radio scheme for the communication service. The accuracy information database 34 may store performance information related to the measurement of the base station apparatus 2. For example, the performance information related to the measurement of the base station apparatus 2 is information indicating a measuring time per square meter. The operation information database 35 stores an operation status information being information indicating an operation status of the base station apparatus 2.

Figures 5, 6:
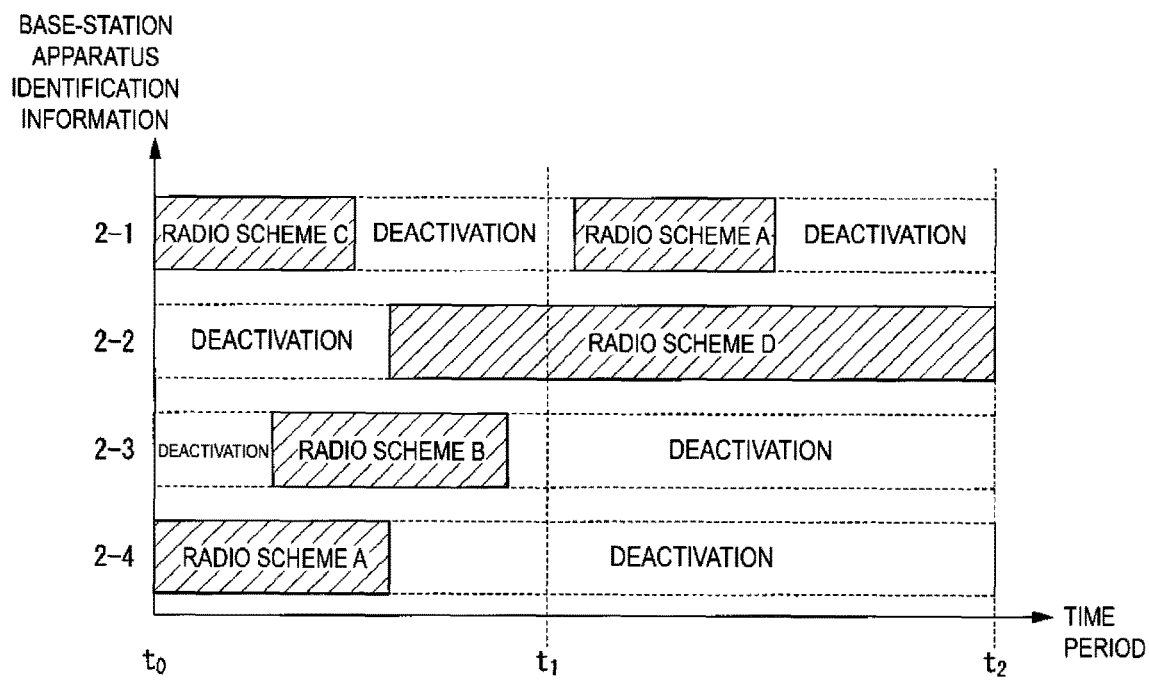
FIG. 5 is a diagram illustrating an example of an operation status information table in the first embodiment.
FIG. 6 is a diagram illustrating a schedule of an operation status of the base station apparatus in the first embodiment.

FIG. 5 is a diagram illustrating an example of the operation status information table. In the operation status information table, base-station apparatus identification information, a position, a mounted radio scheme, operation information, an operating radio scheme, and measurement availability are associated with each other. FIG. 5 illustrates an operation status of each base station apparatus 2 at a time point $t_1$.

The base-station apparatus identification information refers to identification information of the base station apparatus 2. The position refers to a position (coordinates) of the base station apparatus 2 disposed in the area. The mounted radio scheme refers to a radio scheme corresponding to software installed on the base station apparatus 2. Examples of the mounted radio scheme include 802.11ac, 802.11ah, ZigBee (registered trademark), and Wi-SUN. The operation information refers to information indicating whether the base station apparatus 2 is performing communication in the mounted radio scheme. In a case where the base station apparatus is performing communication, the operation information is described as "operating". The operating radio scheme means information indicating a mounted radio scheme during an operation (during a communication). The operating radio scheme may include information indicating a wireless channel. The measurement availability means information indicating whether measurement of the radio wave environment is possible (whether the operation information indicates being stopped). In a case where the measurement of the radio wave environment is possible, the measurement availability is described as "available".

FIG. 6 is a diagram illustrating a schedule of the operation statuses of the base station apparatuses 2-1 to 2-4. A vertical axis indicates base-station apparatus identification information. A horizontal axis indicates the future time. In FIG. 6, at a time point $t_0$, the base station apparatus 2-1 performs a communication (data communication) of a radio scheme C. At the time point $t_0$, the base station apparatus 2-2 is deactivated without performing a wireless communication. At the time point $t_0$, the base station apparatus 2-3 is deactivated without performing a wireless communication. At the time point $t_0$, the base station apparatus 2-4 performs a communication of a radio scheme A. As represented in the operation status information table illustrated in FIG. 5, at a time point $t_1$, the base station apparatus 2-2 performs a communication of a radio scheme D.

Returning to FIG. 4, the example of the configuration of the control apparatus 3 will be described. The characteristic information database 36 stores characteristic information such as a frequency band to be used, for each radio scheme. The generation unit 37 acquires information indicating the measurement accuracy required to satisfy the communication quality required by the communication service, from the accuracy information database 34 The generation unit 37 generates information (referred to as "association information" below) indicating the association between the number of base station apparatuses 2 and the measuring time, such that the measurement accuracy in the radio wave environment satisfies the required measurement accuracy. The generation unit 37 acquires the operation status information table as illustrated in FIG. 5, from the operation information database 35.

The generation unit 37 generates information indicating the maximum number of base station apparatuses 2 capable of measuring the radio wave environment, such that the base station apparatus 2 performs measurement in a deactivation time range registered in the operation status information table. For example, in a case where the number of base station apparatuses 2 that are resting at the same time is 2, the generation unit 37 generates information indicating the maximum number "2" of the base station apparatuses 2 capable of measuring the radio wave environment, for each time point defined in the defined in the deactivation time range. The generation unit 37 outputs the information indicating the maximum number of base station apparatuses 2 capable of measuring the radio wave environment, to the instruction unit 38.

The generation unit 37 generates information indicating the measuring time based on the association information and the number of base station apparatuses 2. The generation unit 37 generates information indicating the measuring time such that the measuring time does not exceed the length of the deactivation time range registered in the operation status information table. The generation unit 37 outputs the information indicating the measuring time to the instruction unit 38.

Figure 7:
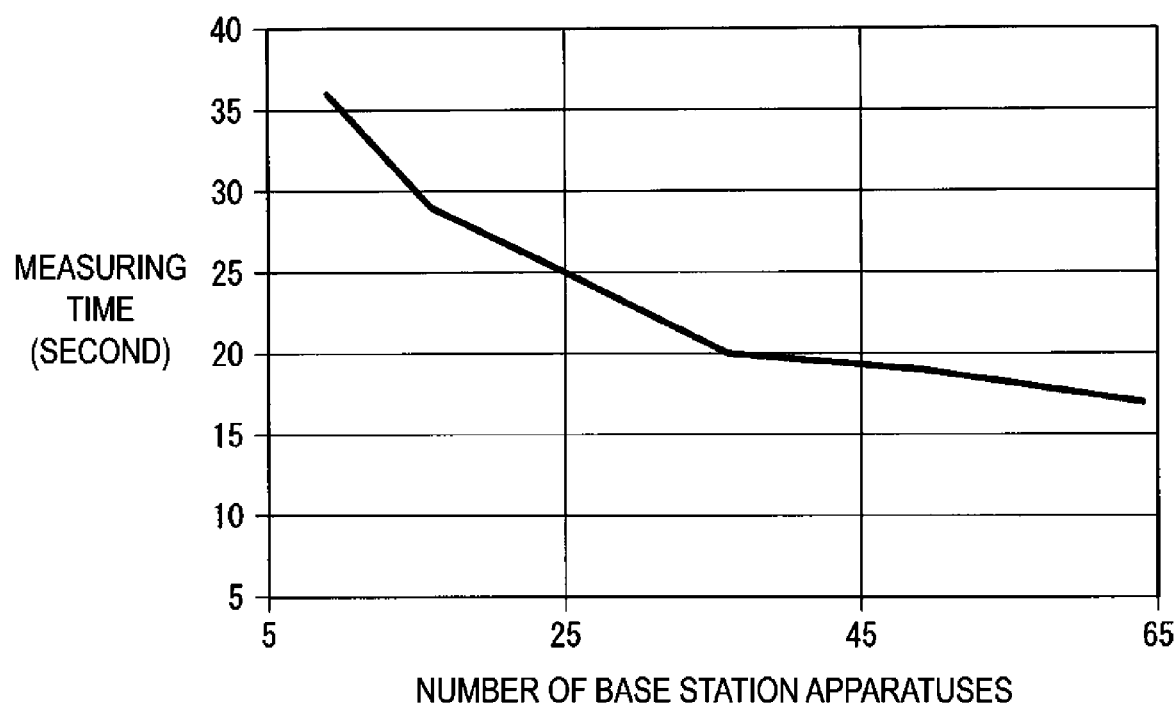
FIG. 7 is a diagram illustrating an example of a correspondence between the number of base station apparatuses and a measuring time in the first embodiment.

FIG. 7 is a diagram illustrating an example of the association between the number of base station apparatuses 2 and the measuring time. In FIG. 7, a vertical axis indicates the measuring time. A horizontal axis indicates the number of base station apparatuses 2. In the simulation of the association illustrated in FIG. 7, the area of the entire area is 100×100 square meters. The number of base station apparatuses 2 that perform the measurement is represented by the horizontal axis in FIG. 7, and is 9, 16, 25, 36, 49, and 64. The measuring time per square meter is represented in the vertical axis of FIG. 7 and is 1 second per radio scheme.

In a case where the measurement accuracy of the radio wave environment is determined to be equal to or greater than an accuracy threshold, the number of base station apparatuses 2 that perform the measurement and the measuring time have a tradeoff relation. As the number of base station apparatuses 2 that measure the radio wave environment increases, the measuring time required to measure the radio wave environment in the entire area becomes shorter. In this case, it is not possible that the base station apparatus 2 that is measuring the radio wave environment performs a data communication. Thus, the throughput of the base station apparatus 2 decreases. As the number of base station apparatuses 2 that measure the radio wave environment decreases, the measuring time required to measure the radio wave environment of the entire area becomes longer. In this case, the base station apparatus 2 that measures the radio wave environment can perform data communication, and thus the throughput of the base station apparatus 2 increases.

In a radio scheme requiring the high communication quality requiring a radio wave environment map, the measurement accuracy of the radio wave environment needs to be equal to or greater than or the accuracy threshold. In order for the base station apparatus 2 to complete the measurement such that the measurement accuracy is equal to or greater than the accuracy threshold in the measuring time, it is necessary that the number of base station apparatuses 2 that perform the measurement is equal to or greater than a predetermined value. In a case where the number of base station apparatuses 2 that perform measurement is limited to being smaller than a predetermined value, the measuring time needs to be increased until the measurement accuracy of the radio wave environment measured by the base station apparatuses 2 for which the number is smaller than the predetermined value becomes equal to or greater than the accuracy threshold.

The instruction unit 38 acquires the information indicating the number of base station apparatuses 2 from the generation unit 37. The instruction unit 38 selects the base station apparatuses 2 corresponding to the value of the information indicating the number of base station apparatuses 2, as base station apparatuses 2 that are to measure the radio wave environment.

The instruction unit 38 acquires the information indicating the measuring time from the generation unit 37. The instruction unit 38 assigns a time range having a length which is equal to or longer than the measuring time, to the selected base station apparatus 2, as a time range in which the base station apparatus 2 performs the measurement. For example, the instruction unit 38 assigns a time range in which the measurement is performed in the deactivation time range, to the selected base station apparatus 2.

The instruction unit 38 may acquire the characteristic information such as the frequency band to be used, from the characteristic information database 36. In a case where the frequency bands to be used for the measurement between adjacent base station apparatuses 2 are identical to each other, the instruction unit 38 may assign the time range for the measurement to each of the base station apparatuses 2 such that the time range for the measurement is different between the adjacent base station apparatuses 2. Thus, the instruction unit 38 can prevent interference of radio waves.

In this manner, the instruction unit 38 generates measurement schedule information. The instruction unit 38 instructs the one or more selected base station apparatuses 2 to measure the radio wave environment. In other words, the instruction unit 38 outputs the measurement schedule information to the control communication unit 31.

Figure 8:
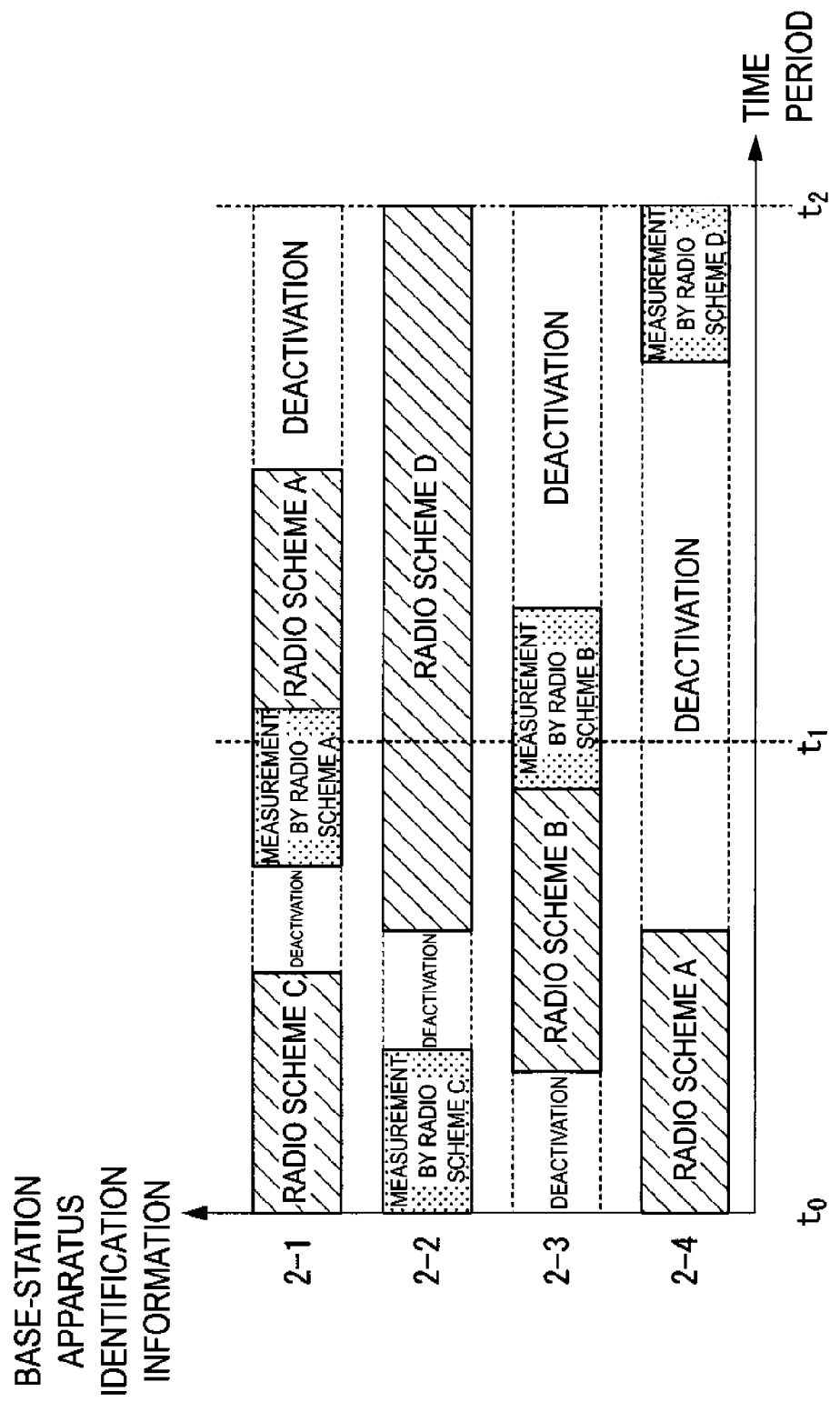
FIG. 8 is a diagram illustrating a schedule of the operation status and a measurement status of the base station apparatus in the first embodiment.

FIG. 8 is a diagram illustrating a schedule of the operation statuses and the measurement statuses of the base station apparatuses 2-1 to 2-4. A vertical axis indicates base-station apparatus identification information. A horizontal axis indicates the future time. The operation statuses of the base station apparatuses 2-1 to 2-4 illustrated in FIG. 8 are identical to the operation statuses of the base station apparatuses 2-1 to 2-4 illustrated in FIG. 6.

In FIG. 8, a schedule of the measurement status is added to the schedule of the operation status illustrated in FIG. 6. At a time point $t_0$, the base station apparatus 2-2 starts measurement of the radio scheme C. At a time point $t_1$, the base station apparatus 2-1 starts measurement of the radio scheme A. At the time point $t_1$, the base station apparatus 2-3 starts measurement of a radio scheme B. At the time point $t_1$, the base station apparatus 2-4 starts measurement of the radio scheme D.

The acquisition unit 39 (collection unit) may generate a radio wave environmental information map based on the measurement result of the radio wave environment in each section. The acquisition unit 39 records the generated radio wave environmental information map in the environmental information database 40. The environmental information database 40 stores the radio wave environmental information map generated by the acquisition unit 39.

Figure 9:
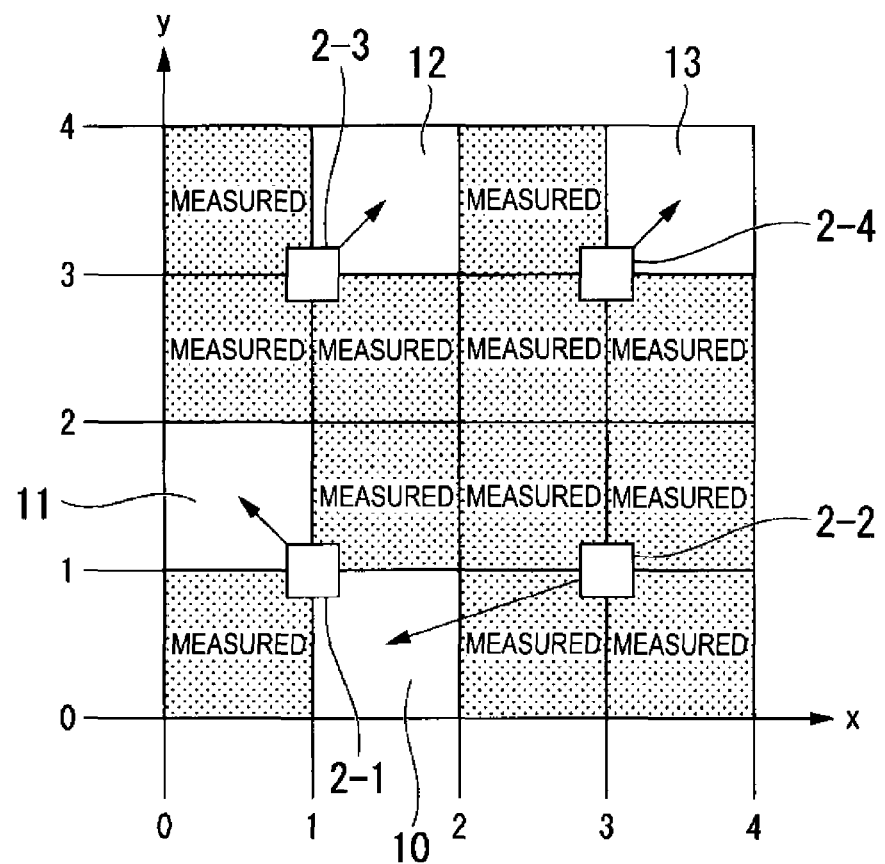
FIG. 9 is a diagram illustrating an example of a radio wave environmental information map based on a measurement result of a radio wave environment in the first embodiment.

FIG. 9 is a diagram illustrating an example of the radio wave environmental information map based on the measurement result of the radio wave environment. In the area illustrated in FIG. 9, radio wave environments in sections 10, 11, 12, and 13 are not measured.

The base station apparatus 2 acquires measurement schedule information from the control apparatus 3. The base station apparatus 2-1 measures the radio wave environment of the radio scheme indicated by the measurement schedule information, in the section 11 being the measurement target indicated by the measurement schedule information. The base station apparatus 2-3 measures the radio wave environment of the radio scheme indicated by the measurement schedule information, in the section 12 being the measurement target indicated by the measurement schedule information. The base station apparatus 2-4 measures the radio wave environment of the radio scheme indicated by the measurement schedule information, in the section 13 being the measurement target indicated by the measurement schedule information.

The base station apparatus 2-2 measures the radio wave environment of the radio scheme indicated by the measurement schedule information, in the section 10 being the measurement target indicated by the measurement schedule information. In this manner, the base station apparatus 2-2 may measure the radio wave environment in the section 10 near the base station apparatus 2-1, instead of the base station apparatus 2-1. For example, in a case where the radio wave environment in each section near the base station apparatus 2-2 has been measured, the instruction unit 38 generates such measurement schedule information. That is, the instruction unit 38 may cause another base station apparatus 2 to measure the radio wave environment in the section within a predetermined range from the base station apparatus 2. Thus, in the control apparatus 3, it is possible to further improve the efficiency of acquiring the radio wave environmental information to cover the entire area.

Next, an example of the operation of the environmental information acquisition system 1 will be described.

Figure 10:
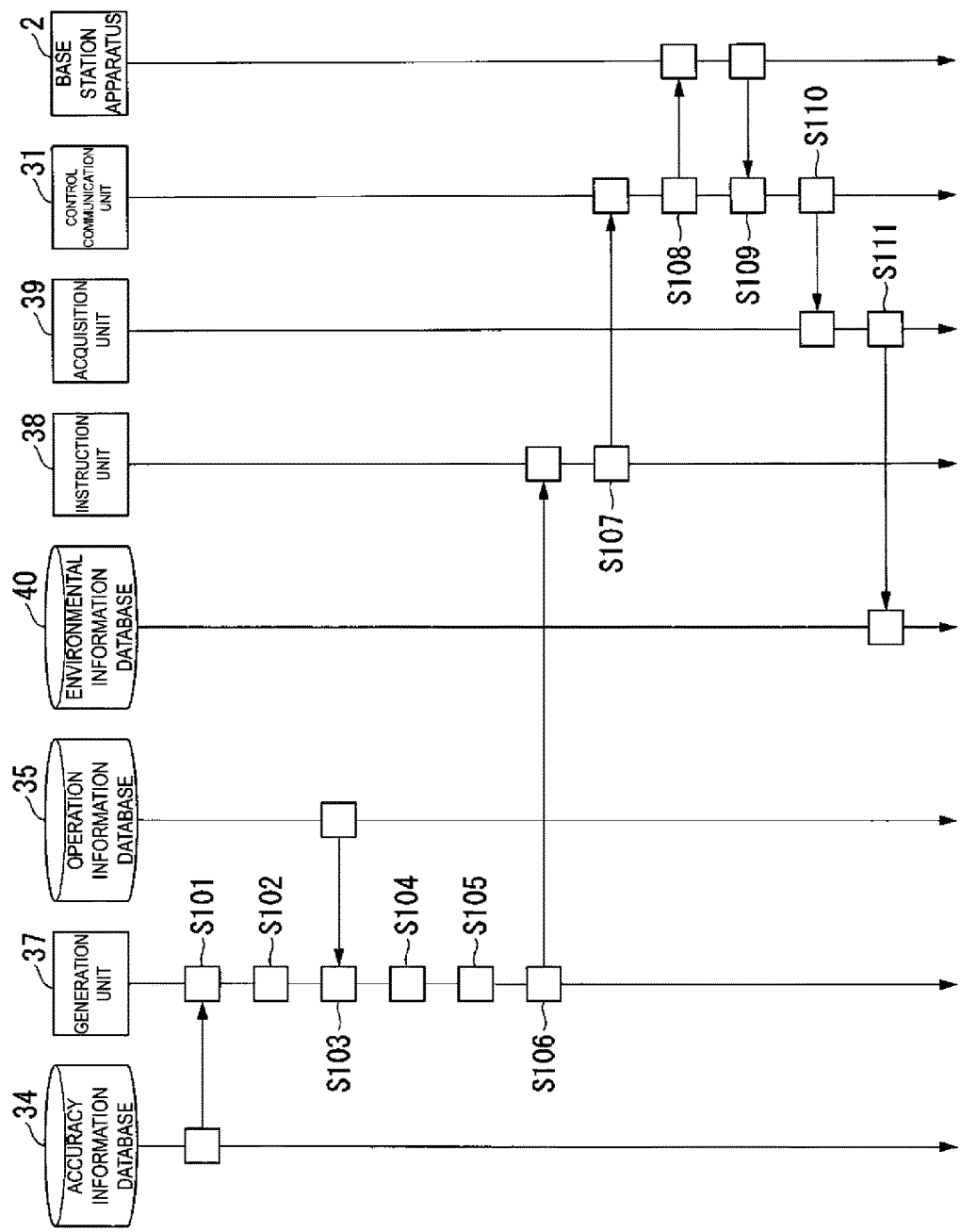
FIG. 10 is a sequence diagram illustrating an example of an operation of the environmental information acquisition system that performs selection of the base station apparatus and determination of the measuring time in the first embodiment.

FIG. 10 is a sequence diagram illustrating an example of the operation of the environmental information acquisition system 1 that performs selection of the base station apparatus 2 and determination of the measuring time. The generation unit 37 acquires information indicating the measurement accuracy required to satisfy the communication quality required by the communication service, from the accuracy information database 34 (Step S101).

The generation unit 37 generates association information such that the measurement accuracy of the radio wave environment satisfies the required measurement accuracy (Step S102). The generation unit 37 acquires the operation status information table from the operation information database 35 (Step S103).

The generation unit 37 generates information indicating the maximum number of base station apparatuses 2 that can measure the radio wave environment for each time point defined in the time range of the pause registered in the operation status information table (Step S104). The generation unit 37 generates information indicating the measuring time based on the association information and the maximum number of base station apparatuses 2 capable of measuring the radio wave environment (Step S105). The generation unit 37 outputs the information indicating the maximum number of base station apparatuses 2 capable of measuring the radio wave environment and the information indicating the measuring time, to the instruction unit 38 (Step S106).

The instruction unit 38 selects the base station apparatus 2 that measures the radio wave environment, up to a value which is equal to or smaller than the maximum number of base station apparatuses 2 capable of measuring the radio wave environment. The instruction unit 38 assigns a time range in which the measurement is performed, to the selected base station apparatus 2 based on the information indicating the measuring time. In this manner, the instruction unit 38 generates measurement schedule information. The instruction unit 38 outputs the measurement schedule information to the control communication unit 31 (Step S107).

The control communication unit 31 transmits the measurement schedule information to the selected base station apparatus 2 (Step S108). The control communication unit 31 acquires a measurement result of the radio wave environment from the base station apparatus 2 that has measured the radio wave environment based on the measurement schedule information (Step S109). The control communication unit 31 outputs the measurement result of the radio wave environment of each section to the acquisition unit 39 (Step S110). The acquisition unit 39 generates a radio wave environmental information map based on the measurement result of the radio wave environment in each section. The acquisition unit 39 records the radio wave environmental information map in the environmental information database 40 (Step S111).

As described above, the control apparatus 3 (environmental (environment) information acquisition apparatus) in the first embodiment includes the distribution unit 33, the instruction unit 38, and the control communication unit 31. The distribution unit 33 distributes software to one or more base station apparatuses 2 that measure the radio wave environment of each radio scheme based on software of each radio scheme. The instruction unit 38 instructs the one or more base station apparatuses 2 to measure the radio wave environment. The control communication unit 31 acquires the measurement results of the radio wave environments in multiple sections defined in the entire area, from the one or more base station apparatuses 2 that have performed measurement based on software.

Thus, in the environmental information acquisition system 1 in the first embodiment, it is possible to improve the efficiency of acquiring radio wave environmental information to cover the entire area.

In the environmental information acquisition system 1, it is possible to efficiently acquire radio wave environmental information of a desired radio scheme from the base station apparatus 2 by performing switching of software installed on the base station apparatus 2 for each radio scheme, even though the radio wave environmental information is radio wave environmental information not allowed to be acquired originally because the protocol of the radio scheme is different.

In the environmental information acquisition system 1, the relation between the required measuring time and the number of base station apparatuses 2 that perform measurement is calculated in order to measure the radio wave environment of each radio scheme to be used by the terminal so as to cover the entire area. In the environmental information acquisition system 1, the measuring time is determined based on the calculated relation and the number of base station apparatuses 2 capable of performing measurement. In the environmental information acquisition system 1, the base station apparatus 2 capable of performing measurement is instructed to perform the measurement with the measuring time.

Second Embodiment

A second embodiment is different from the first embodiment in that the control apparatus 3 estimates not-measured radio wave environmental information based on the measured radio wave environmental information. Differences of the second embodiment from the first embodiment will be described.

Figure 11:
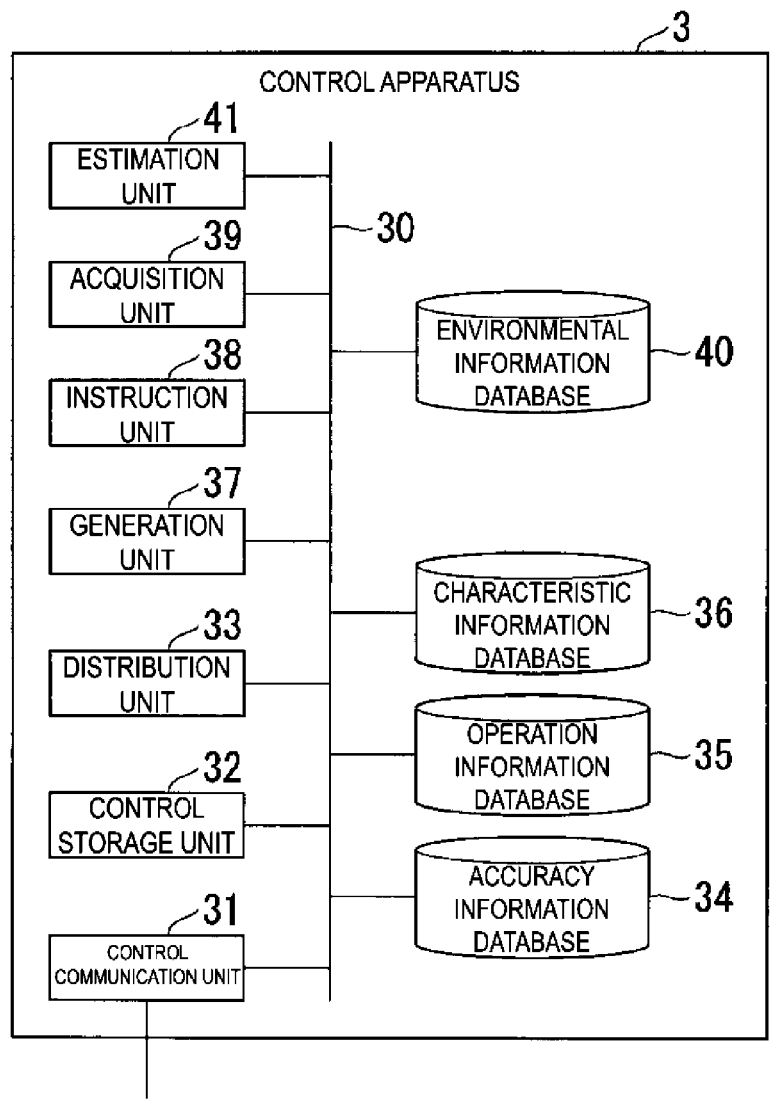
FIG. 11 is a diagram illustrating an example of a configuration of a control apparatus according to a second embodiment.

FIG. 11 is a diagram illustrating an example of the configuration of the control apparatus 3. The control apparatus 3 includes a bus 30, a control communication unit 31, a control storage unit 32, a distribution unit 33, an accuracy information database 34, an operation information database 35, a characteristic information database 36, a generation unit 37, an instruction unit 38, an acquisition unit 39, an environmental information database 40, and an estimation unit 41.

The estimation unit 41 acquires the radio wave environmental information map from the environmental information database 40. The estimation unit 41 estimates the radio wave environment in a section where the radio wave environment is not measured, based on the measured radio wave environment in other sections near the above section. The estimation unit 41 estimates the radio wave environment in the section where the radio wave environment is not measured, based on a temporal change of the measured radio wave environment in the section. The estimation unit 41 estimates the radio wave environment in the section where the radio wave environment is not measured, based on time correlation or spatial correlation of the radio wave environment.

Figure 12:
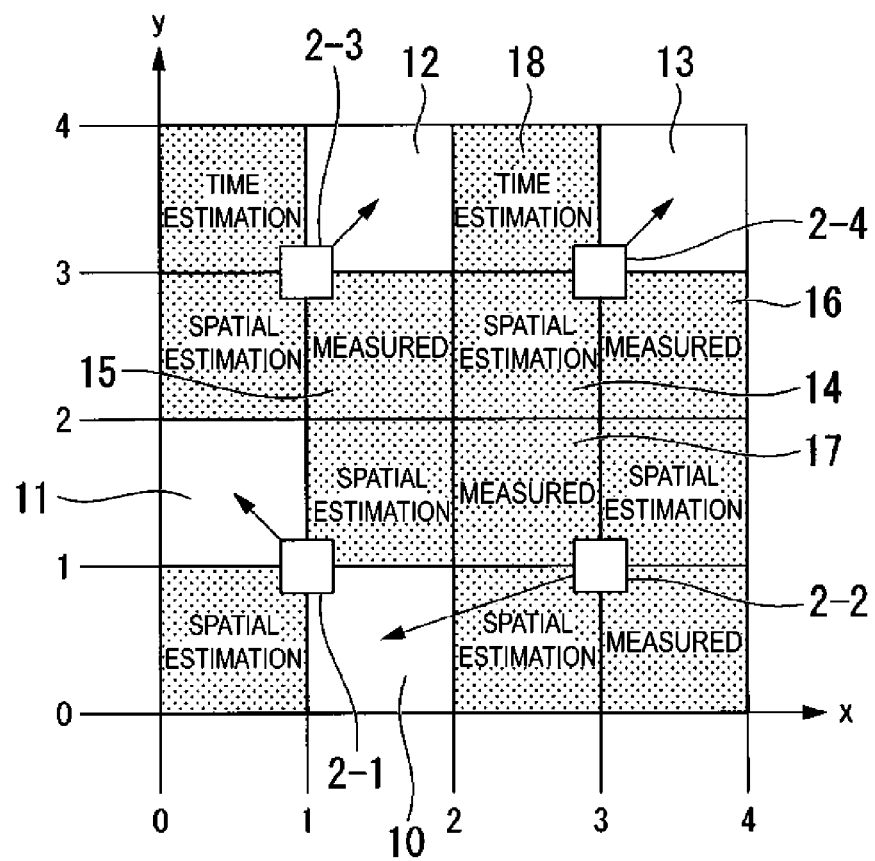
FIG. 12 is a diagram illustrating an example of a radio wave environmental information map based on time estimation and spatial estimation of a radio wave environment in the second embodiment.

FIG. 12 is a diagram illustrating an example of the radio wave environmental information map based on time estimation and spatial estimation of a radio wave environment. The control storage unit 32 stores the previous time-series radio wave environmental information for each section. In a case where the information volume of the previous time-series radio wave environmental information is equal to or greater than a predetermined amount, the estimation unit 41 may perform time estimation processing based on the previous time-series radio wave environmental information. For example, the estimation unit 41 performs the time estimation processing based on the previous time-series radio wave environmental information in a section 18. The estimation unit 41 estimates time-series radio wave environmental information in the section 18 in the future, based on the result of the time estimation processing. The estimation unit 41 may estimate the radio wave environmental information at a time point in the future, based on radio wave environmental information which changes periodically over time. The estimation unit 41 may estimate the radio wave environmental information at a time point in the future, based on the time average value of the value indicated by the previous time-series radio wave environmental information.

The estimation unit 41 may perform spatial estimation processing on a section near which, for example, three or more sections where the radio wave environment has been measured are provided. The spatial estimation processing may be performed based on the radio wave environmental information in the three or more sections near the above section. In FIG. 12, sections 15, 16, and 17 where the radio wave environment has been measured are in the vicinity of a section 14. The estimation unit 41 estimates radio wave environmental information in the section 14 based on the radio wave environmental information in the sections 15, 16, and 17. The estimation unit 41 may estimate the radio wave environmental information in the section 14 based on the spatial average value of values indicated by the radio wave environmental information in the sections 15, 16, and 17. The value indicated by the radio wave environmental information of the section has a weight defined for each section.

The control communication unit 31 may determine that it is not possible to perform the time estimation processing based on radio wave environmental information, for sections 12 and 13 where the information volume of the previous time-series radio wave environmental information is smaller than a predetermined amount. The control communication unit 31 may determine that it is not possible to perform the spatial estimation processing based on the radio wave environmental information, for sections 10 and 11 near which only one section where the radio wave environment has been measured is provided.

The control communication unit 31 acquires the measurement result of the radio wave environment from the base station apparatus 2 that has measured the radio wave environment in the sections 10, 11, 12, and 13 where the radio wave environment is not estimated.

In the environmental information acquisition system 1, even though a section where the radio wave environment is not measured is provided in the area, the estimation unit 41 estimates the radio wave environment for a short time period, and thus it is possible to improve the efficiency of acquiring the radio wave environmental information to cover the entire area.

Next, an example of the operation of the environmental information acquisition system 1 will be described.

Figure 13:
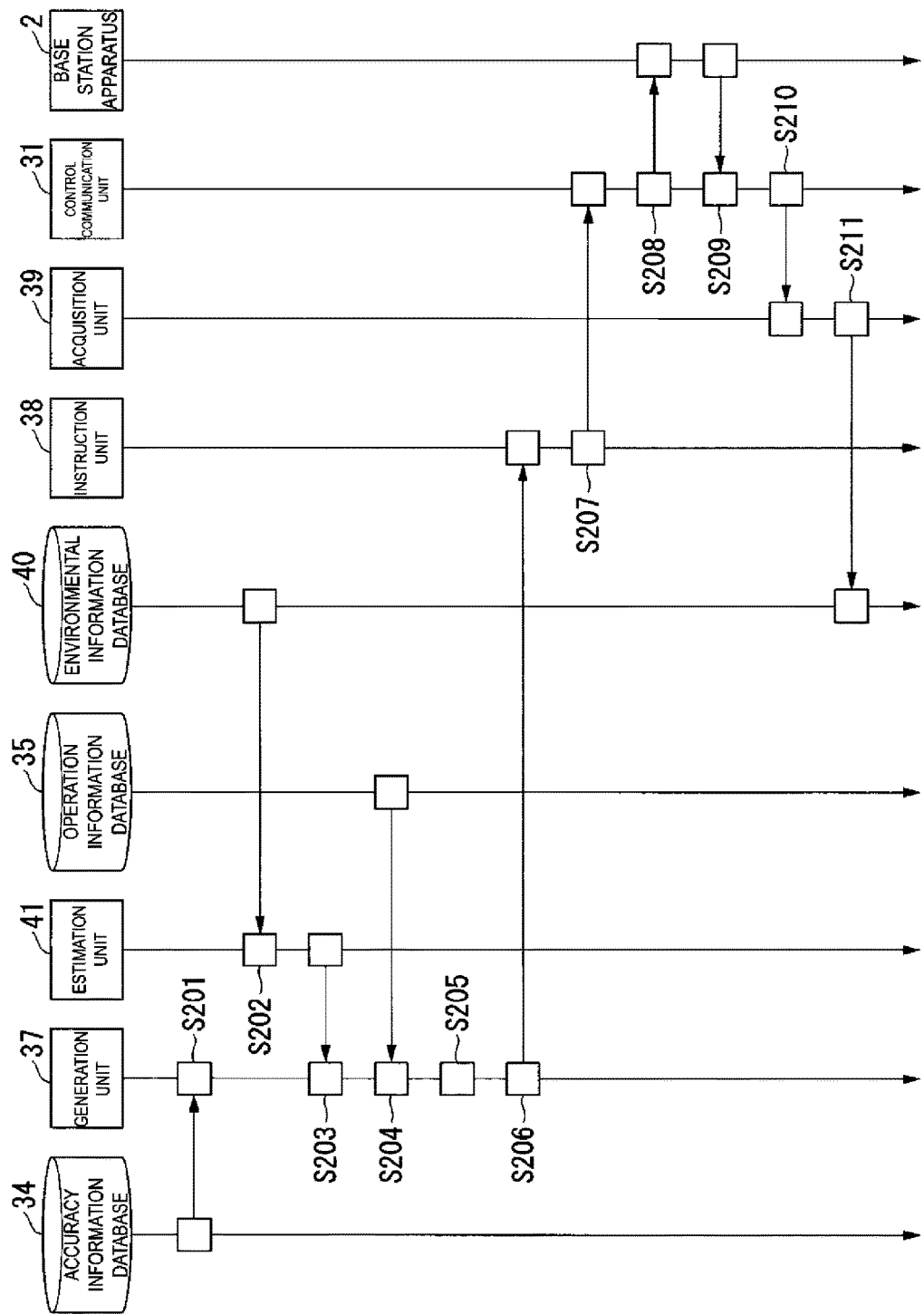
FIG. 13 is a sequence diagram illustrating an example of an operation of an environmental information acquisition system that performs the time estimation and the spatial estimation of the radio wave environment in the second embodiment.

FIG. 13 is a sequence diagram illustrating an example of the operation of the environmental information acquisition system 1 that performs the time estimation and the spatial estimation of the radio wave environment. The generation unit 37 acquires information indicating the measurement accuracy required to satisfy the communication quality required by the communication service, from the accuracy information database 34 (Step S201).

The estimation unit 41 acquires the radio wave environmental information map from the environmental information database 40. The estimation unit 41 estimates the radio wave environment in a section where the radio wave environment is not measured, based on the measured radio wave environment in other sections near the above section. The estimation unit 41 estimates the radio wave environment in the section where the radio wave environment is not measured, based on a temporal change of the measured radio wave environment in the section (Step S202).

The generation unit 37 generates information indicating a section where the radio wave environment is not measured and the radio wave environment is not estimated, as information indicating a section where the radio wave environment needs to be measured (Step S203). The generation unit 37 acquires the operation status information table from the operation information database 35 (Step S204).

The generation unit 37 selects the base station apparatus 2 that measures the radio wave environment, based on a deactivation time range registered in the operation status information table and the section where the radio wave environment needs to be measured (Step S205). The generation unit 37 outputs information indicating the selected base station apparatus 2 and information indicating the deactivation time range, to the instruction unit 38 (Step S206).

The instruction unit 38 assigns a time range in which the measurement is performed in the deactivation time range, to the selected base station apparatus 2. In this manner, the instruction unit 38 generates measurement schedule information. The instruction unit 38 outputs the measurement schedule information to the control communication unit 31 (Step S207).

The control communication unit 31 transmits the measurement schedule information to the selected base station apparatus 2 (Step S208). The control communication unit 31 acquires a measurement result of the radio wave environment from the base station apparatus 2 that has measured the radio wave environment based on the measurement schedule information (Step S209). The control communication unit 31 outputs the measurement result of the radio wave environment of each section to the acquisition unit 39 (Step S210). The acquisition unit 39 adds the measurement result of the radio wave environment of each section to the section where the radio wave environment needs to be measured in the radio wave environmental information map. The acquisition unit 39 records the radio wave environmental information map in the environmental information database 40 (Step S211).

As described above, in the second embodiment, the control apparatus 3 further includes the estimation unit 41. The estimation unit 41 estimates the radio wave environment in the section where the radio wave environment is not measured, based on time correlation or spatial correlation of the radio wave environment. The control communication unit 31 acquires the measurement result of the radio wave environment from the base station apparatus 2 that has measured the radio wave environment in the section where the radio wave environment is not estimated by the estimation unit 41.

Thus, in the environmental information acquisition system 1 in the second embodiment, even though a section where the radio wave environment is not measured is provided in the area, the estimation unit 41 estimates the radio wave environment for a short time period, and thus it is possible to improve the efficiency of acquiring the radio wave environmental information to cover the entire area.

The environmental information acquisition system 1 estimates the radio wave environment at a predetermined time point in the future, based on the previous measurement result of the radio wave environment, and measures the radio wave environment of the section where the radio wave environment is not estimated. The environmental information acquisition system 1 estimates the radio wave environment in a second section which is spatially close to a first section, and measures the radio wave environment of the first section where the radio wave environment is not estimated. Thus, in the environmental information acquisition system 1, it is possible to acquire the radio wave environmental information using resources of the base station apparatus 2, which are used for measurement, only for a required time period.

Third Embodiment

A third embodiment is different from the second embodiment in that the base station apparatus capable of measuring the radio wave environment in multiple sections a small number of times is preferentially assigned to measurement the radio wave environment. Differences of the third embodiment from the second embodiment will be described.

Even after the radio wave environment has been measured comprehensively in the entire area, the radio wave environment changes over time. Thus, the control apparatus 3 may cause the base station apparatus 2 to measure the radio wave environment, for example, in a section where the radio wave environment has largely changed in the past, again. In the following description, a not-measured section may refer to not only a section where the radio wave environment is not measured at all, but also a section where the radio wave environment needs to be measured again.

Figure 14:
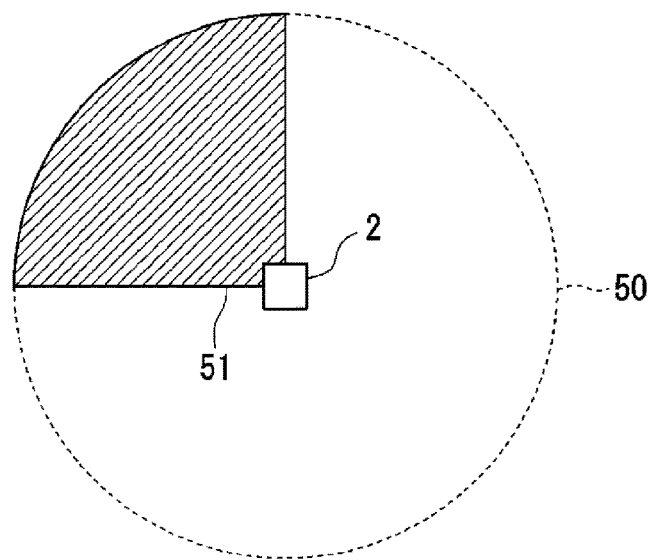
FIG. 14 is a diagram illustrating an example of a measurable range and a measurement range according to a third embodiment.

FIG. 14 is a diagram illustrating an example of a measurable range and a measurement range. A measurable range 50 indicates a range in which the base station apparatus 2 can measure the radio wave environment. The width of the measurable range 50 is determined in accordance with the transmission output of radio waves of the base station apparatus 2, for example. A measurement range 51 is a range in which the base station apparatus 2 can transmit radio waves in one measurement. That is, the measurement range 51 is a range in which the measurement is completed by one measurement. The measurement range 51 is determined in accordance with the transmission output of the radio waves of the base station apparatus 2 and the direction of an antenna that transmits and receives radio waves.

Figure 15:
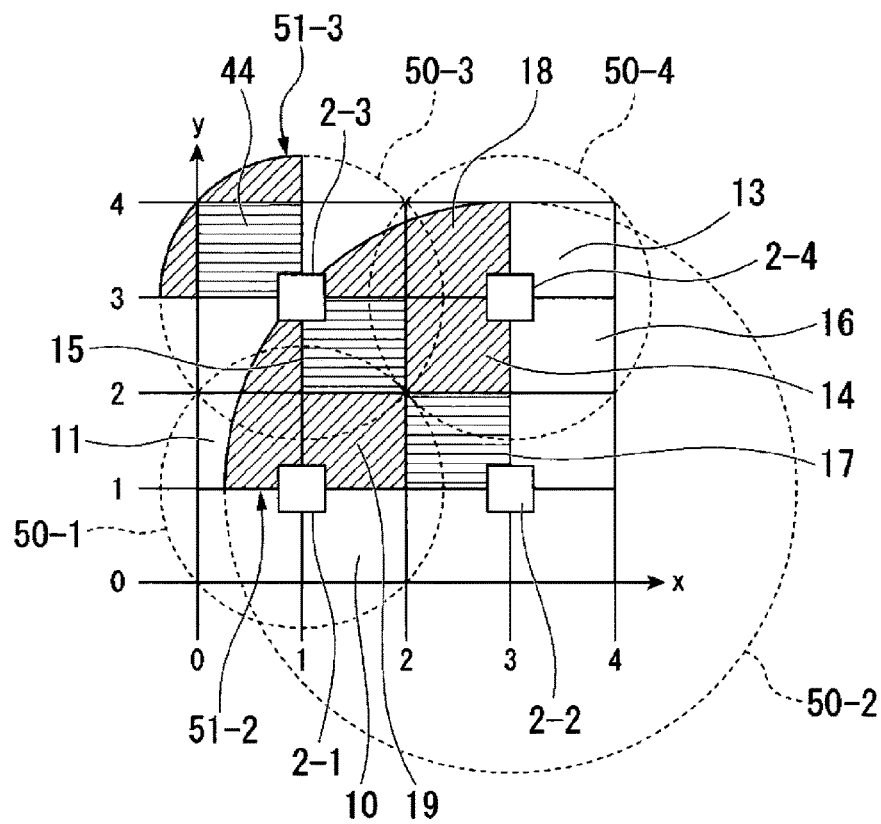
FIG. 15 is a diagram illustrating an example of a relation between a position of a base station apparatus and an unmeasured section in the third embodiment.

FIG. 15 is a diagram illustrating an example of a relation between the position of the base station apparatus 2 and a not-measured section. In FIG. 15, among a measurable range 50-1 of the base station apparatus 2-1, a measurable range 50-2 of the base station apparatus 2-2, a measurable range 50-3 of the base station apparatus 2-3, and a measurable range 50-4 of the base station apparatus 2-4, the measurable range 50-2 is the widest in one example.

The not-measured sections 15 and 17 are in the measurement range 51-2 (measurement direction) of the base station apparatus 2-2. Thus, the base station apparatus 2-2 can measure the radio wave environment in the not-measured sections 15 and 17 of a measurement range 51-2 in the measurable range 50-2 by one measurement. The control apparatus 3 assigns the base station apparatus 2-2 capable of measuring the radio wave environment in multiple sections with a small number of times, to the measurement of the radio wave environment in the not-measured section, with priority over the other base station apparatuses 2. In FIG. 15, the base station apparatus 2-3 performs the measurement in the not-measured sections 15 and 17 of a measurement range 51-2 in the measurable range 50-2. The base station apparatus 2-3 measures the radio wave environment of a not-measured section 44 of a measurement range 51-3 in the measurable range 50-3. Thus, in the environmental information acquisition system 1, it is possible to reduce the number of base station apparatuses 2 that perform the measurement, and to complete the measurement for a short time period.

Figure 16:
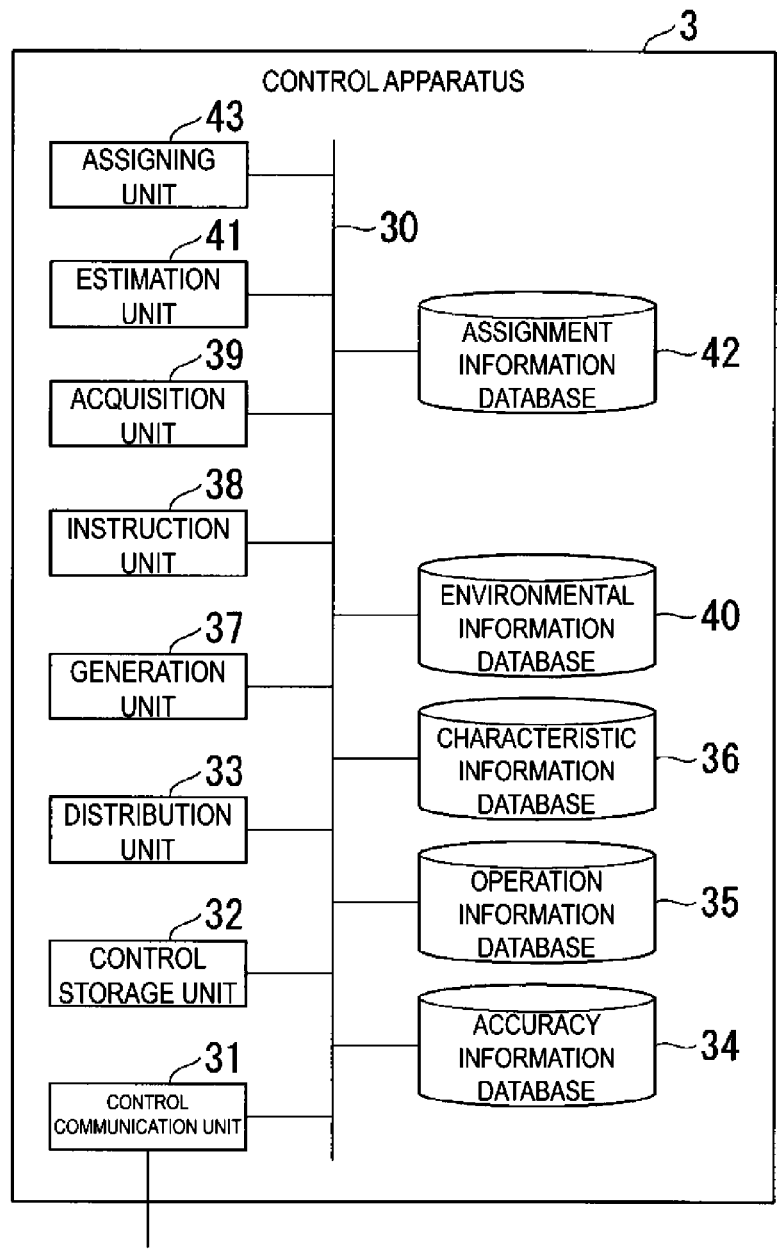
FIG. 16 is a diagram illustrating an example of a configuration of a control apparatus in the third embodiment.

FIG. 16 is a diagram illustrating an example of the configuration of the control apparatus 3. The control apparatus 3 includes a bus 30, a control communication unit 31, a control storage unit 32, a distribution unit 33, an accuracy information database 34, an operation information database 35, a characteristic information database 36, a generation unit 37, an instruction unit 38, an acquisition unit 39, an environmental information database 40, an estimation unit 41, an assignment information database 42, and an assigning unit 43.

The assignment information database 42 stores an information table (referred to as "an assignment information table" below) indicating a situation where a base station apparatus that measures the radio wave environment is assigned to a section.

FIG. 17 is a diagram illustrating a first example of the assignment information table. A flag indicating whether a base station apparatus has been assigned to a not-measured section is referred to as "an assignment flag". In the assignment information table, a not-measured section number, section boundary coordinates being boundary coordinates of the not-measured section, candidates for the base station apparatus allowed to be assigned to measurement of the radio wave environment in the not-measured section, a base station apparatus that perform measurement, and an assignment flag are associated with each other. In FIG. 17, the base station apparatus 2 is not assigned to the any not-measured section. Thus, every assignment flag is "not".

The assigning unit 43 acquires the operation status information table from the operation information database 35. The assigning unit 43 acquires the assignment information table from the assignment information database 42. The assigning unit 43 determines whether, for example, the measurement result of the radio wave environment in a section which is randomly selected varies. The assigning unit 43 associates the assignment flag of "not" to the not-measured section. The assigning unit 43 associates the assignment flag of "not" to a section where the radio wave environment changes largely in the past.

FIG. 18 is a diagram illustrating a second example of the assignment information table. The assigning unit 43 selects the base station apparatus 2 planned to deactivate at a time point of performing measurement, from the operation status information table. The assigning unit 43 selects the base station apparatus 2 included in the measurable range 50 including the not-measured section among base station apparatuses 2 planned to deactivate, as the candidate for the base station apparatus 2 allowed to be assigned to measurement of the radio wave environment in the not-measured section.

The assigning unit 43 assigns the base station apparatus that performs measurement, to a not-measured section where the number of candidates for the base station apparatus 2 is 1. In FIG. 18, the assigning unit 43 selects the base station apparatus 2-2 capable of measuring the radio wave environment in multiple sections 17, as the base station apparatus 2 assigned to measurement of the radio wave environment in the not-measured sections 17. The assigning unit 43 assigns the assignment flag of "complete" to the not-measured section 17. The assigning unit 43 selects the base station apparatus 2-3 capable of measuring the radio wave environment in multiple sections 44, as the base station apparatus 2 assigned to measurement of the radio wave environment in the not-measured sections 44. The assigning unit 43 assigns the assignment flag of "complete" to the not-measured section 44.

FIG. 19 is a diagram illustrating a third example of the assignment information table. The assigning unit 43 selects a base station apparatus 2 capable of measuring the radio wave environment in multiple sections with a small number of times (for example, one time) among candidates for the base station apparatus 2 allowed to be assigned to measurement of the radio wave environment in a not-measured section, with priority over the other base station apparatuses 2. The assigning unit 43 selects the base station apparatus 2 as the base station apparatus 2 assigned to the measurement of the radio wave environment in the not-measured section. In FIG. 19, the assigning unit 43 selects the base station apparatus 2-2 capable of measuring the radio wave environment in multiple sections 15 and 17 with one time, as the base station apparatus 2 assigned to measurement of the radio wave environment in the not-measured section 15. The assigning unit 43 assigns the assignment flag of "complete" to the not-measured section 15.

Figure 20:
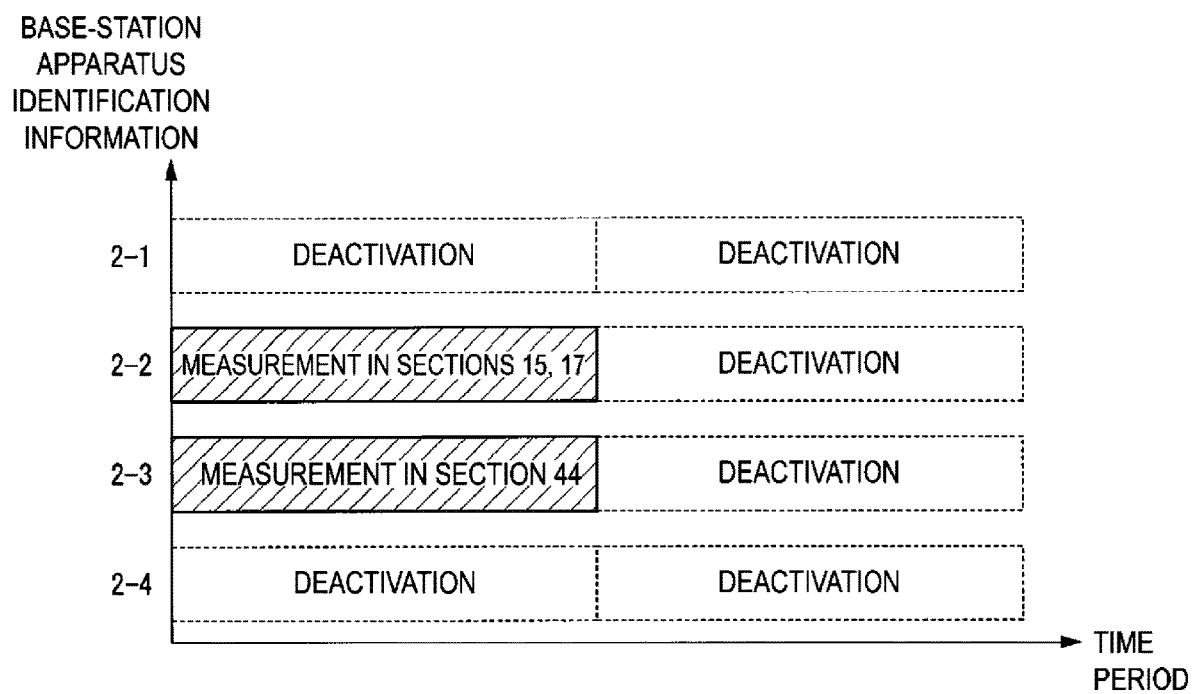
FIG. 20 is a diagram illustrating a schedule of a measurement status of the base station apparatus in the third embodiment.

FIG. 20 is a diagram illustrating a schedule of the measurement status of the base station apparatus 2. In FIG. 20, the base station apparatus 2-2 completes measurement of the radio wave environment in the not-measured sections 15 and 17 included in measurement range 51-2, by one measurement. In this time range, the base station apparatus 2-3 completes the measurement of the radio wave environment in the not-measured section 44 included in the measurement range 51-3 by one measurement.

Figure 21:
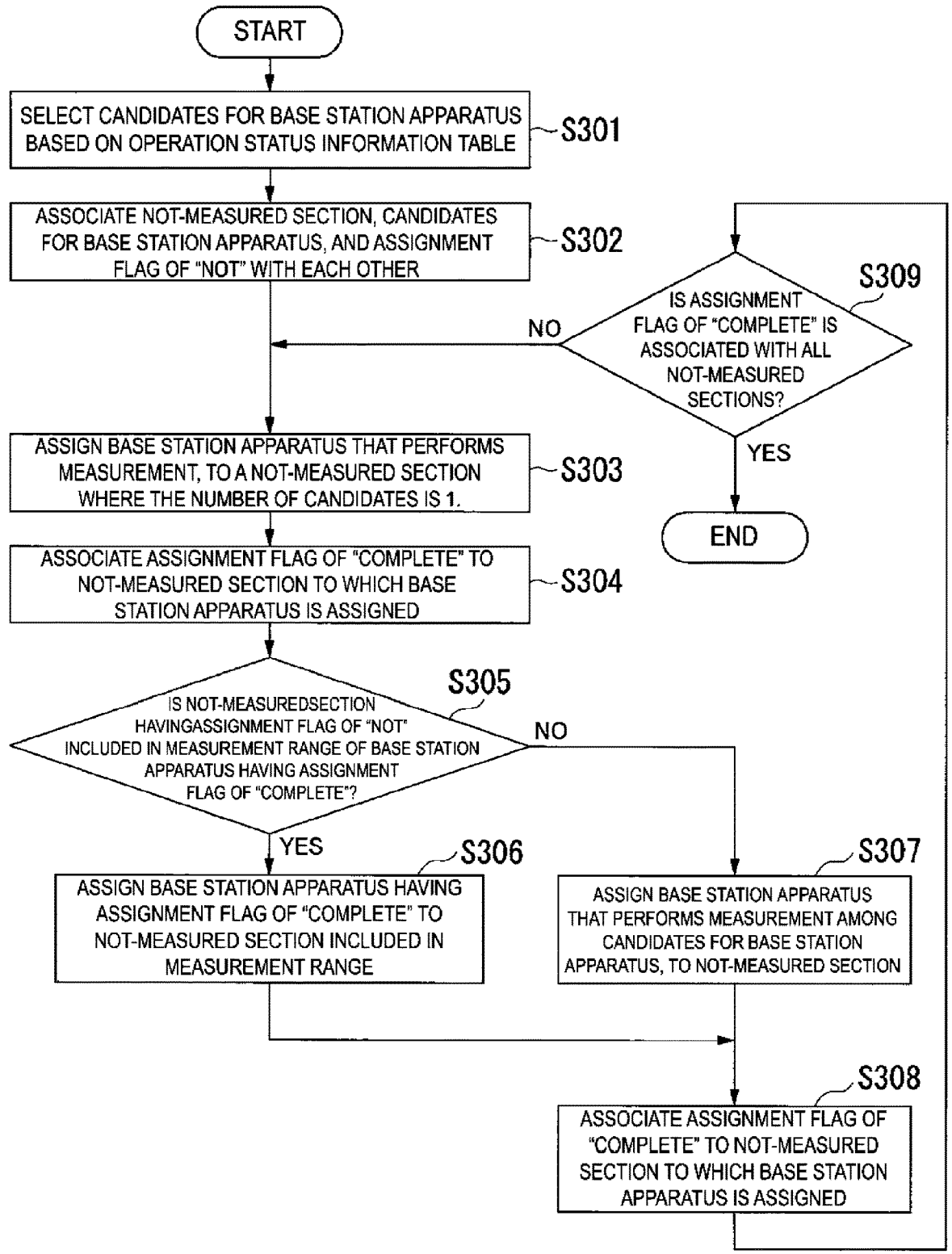
FIG. 21 is a flowchart illustrating an example of an operation of an environmental information acquisition system that assigns the base station apparatus in the third embodiment.

FIG. 21 is a flowchart illustrating an example of the operation of the environmental information acquisition system 1 that assigns the base station apparatus 2. The assigning unit 43 selects a candidate for the base station apparatus 2 that performs measurement, based on the operation status information table (Step S301). The assigning unit 43 associates the not-measured section, the candidate for the base station apparatus 2, and the assignment flag of "not" with each other in the assignment information table (Step S302). The assigning unit 43 assigns the base station apparatus 2 that performs measurement, to a not-measured section where the number of candidates for the base station apparatus 2 is 1 (Step S303). The assigning unit 43 associates the assignment flag of "complete" to the not-measured section to which the base station apparatus 2 is assigned, in the assignment information table (Step S304).

The assigning unit 43 determines whether the not-measured section having an assignment flag of "not" is included in the measurement range 51 of the base station apparatus 2 having an assignment flag of "complete", based on a relation between the section boundary coordinates and the position of the measurement range 51 (Step S305).

In a case where the not-measured section having an assignment flag of "not" is included in the measurement range 51 of the base station apparatus 2 having an assignment flag of "complete" (Step S305: YES), the assigning unit assigns the base station apparatus 2 having an assignment flag of "complete", to measurement of the radio wave environment in the not-measured section included in the measurement range 51 (Step S306). In a case where the not-measured section having an assignment flag of "not" is not included in the measurement range 51 of the base station apparatus 2 having an assignment flag of "complete" (Step S305: NO), the assigning unit assigns the base station apparatus 2 that performs measurement among candidates for the base station apparatus 2, to the measurement of the radio wave environment in the not-measured section (Step S307).

The assigning unit 43 associates the assignment flag of "complete" to the not-measured section to which the base station apparatus 2 is assigned (Step S308). The assigning unit 43 determines whether the assignment flag of "complete" has been assigned to all not-measured sections in the area (Step S309). In a case where the assignment flag of "not" has been assigned to any not-measured section in the area (Step S309: NO), the assigning unit 43 causes the process to proceed to Step S303. In a case where the assignment flag of "complete" has been assigned to all not-measured sections in the area (Step S309: YES), the assigning unit 43 terminates the processing illustrated in FIG. 21. In this manner, the assigning unit 43 completes the measurement of the radio wave environment in the area in a predetermined time period.

As described above, in the third embodiment, the control apparatus 3 further includes the assigning unit 42. The assigning unit 43 preferentially assigns the base station apparatus 2 capable of measuring the radio wave environment in multiple not-measured sections with a small number of times, to the measurement of the radio wave environment in the plurality of not-measured sections.

Thus, in the environmental information acquisition system 1 in the third embodiment, it is possible to further improve the efficiency of acquiring radio wave environmental information to cover the entire area. That is, in the environmental information acquisition system 1, even in a case where the radio wave environment changes over time, it is possible to acquire radio wave environmental information to cover the entire area for a short time period.

Fourth Embodiment

A fourth embodiment is different from the third embodiment in that the base station apparatus 2 having a short distance from the not-measured section is preferentially assigned to measurement of the radio wave environment in the not-measured section. Differences of the fourth embodiment from the third embodiment will be described.

Figure 22:
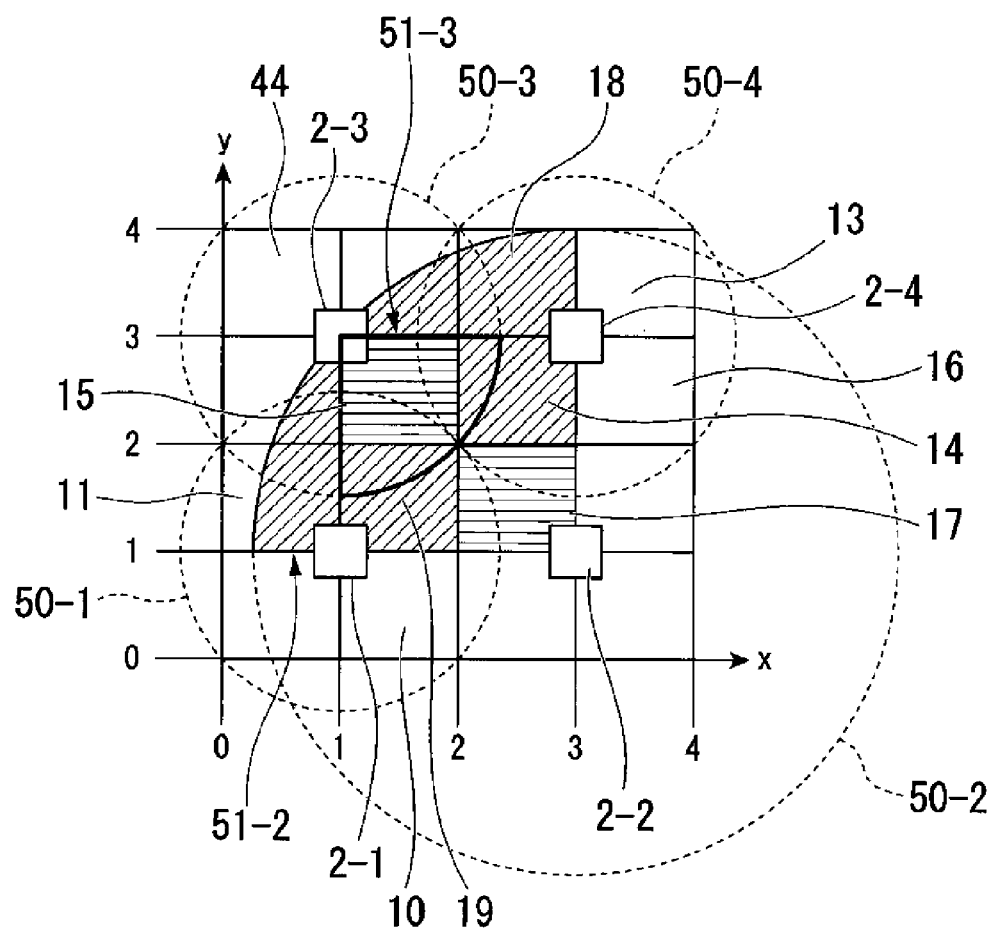
FIG. 22 is a diagram illustrating an example of a relation between a position of a base station apparatus and an unmeasured section according to a fourth embodiment.

FIG. 22 is a diagram illustrating an example of a relation between the position of the base station apparatus 2 and the not-measured section. In FIG. 22, even in a case where either the base station apparatus 2-2 or 2-3 measures the radio wave environment in the not-measured section 15, the measurement of the radio wave environment in the not-measured section 15 is completed by one time. In a case where the measuring time is equal even though any of a plurality of candidates for the base station apparatus 2 is selected, the assigning unit 43 preferentially assigns the base station apparatus 2 having a short distance from the not-measured section to measurement of the radio wave environment in the not-measured section. The base station apparatus 2-3 having a short distance from the not-measured section 15 may be able to more accurately measure the radio wave environment in the not-measured section 15 in comparison to the base station apparatus 2-3. Even though the transmission power of radio waves is suppressed, the base station apparatus 2-3 can measure the radio wave environment in the not-measured section 15.

In a case where selection of the base station apparatus 2 based on the distance is not possible because a plurality of candidates for the base station apparatus 2 have the equal distance from the not-measured section, the assigning unit 43 preferentially the base station apparatus 2 having a short operation time period, to measurement of the radio wave environment in the not-measured section. The assigning unit 43 may preferentially assign the base station apparatus 2 around which the number of terminals to be accommodated is small, to the measurement of the radio wave environment in the not-measured section. The assigning unit 43 may preferentially assign the base station apparatus 2 having low traffic, to the measurement of the radio wave environment in the not-measured section.

The assigning unit 43 may select the base station apparatus 2 capable of satisfying a condition for a high priority among a priority defined in the measuring time and a priority defined in the measurement accuracy.

FIG. 23 is a diagram illustrating an example of the assignment information table. The measuring time is equal even though any of the base station apparatus 2-2 and the base station apparatus 2-3 is selected. Thus, the assigning unit 43 preferentially assigns the base station apparatus 2-3 having a short distance from the not-measured section 15 to measurement of the radio wave environment in the not-measured section 15. The assigning unit 43 assigns the assignment flag of "complete" to the not-measured section 15.

Figure 24:
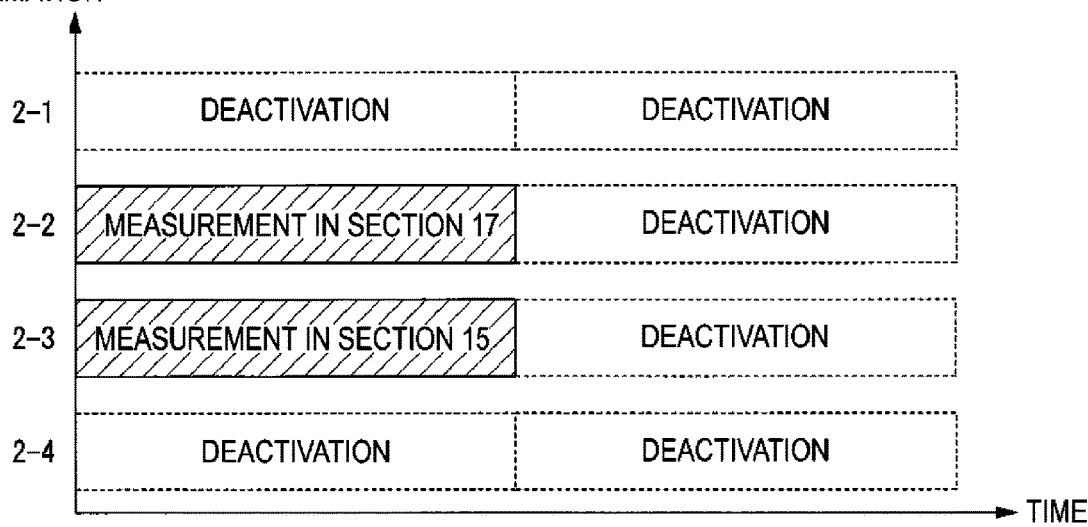
FIG. 24 is a diagram illustrating a schedule of a measurement status of the base station apparatus in the fourth embodiment.

FIG. 24 is a diagram illustrating a schedule of the measurement status of the base station apparatus 2. In FIG. 24, the base station apparatus 2-2 measures the radio wave environment in the not-measured section 15 included in the measurement range 51-2 with high accuracy. In this time range, the base station apparatus 2-3 measures the measurement of the radio wave environment in the not-measured section 17 included in the measurement range 51-3 with high accuracy.

As described above, in the fourth embodiment, the control apparatus 3 further includes the assigning unit 42. The assigning unit 43 preferentially assigns the base station apparatus 2 having a short distance from the not-measured section, to the measurement of the radio wave environment in the not-measured section. In a case where a plurality of base station apparatuses 2 have an equal distance from the section where the radio wave environment is not measured, the assigning unit 43 preferentially assigns the base station apparatus 2 having a short operation time period or the base station apparatus 2 having low traffic, to measurement of the radio wave environment in the not-measured section.

Thus, in the environmental information acquisition system 1 in the fourth embodiment, it is possible to further improve the efficiency of acquiring radio wave environmental information to cover the entire area. That is, in the environmental information acquisition system 1, even in a case where the radio wave environment changes over time, it is possible to acquire radio wave environmental information with high accuracy to cover the entire area.

The embodiments of the present invention have been described above in detail with reference to the drawings. Specific configurations, however, are not limited to those embodiments, and include any design or the like within the scope not departing from the gist of the present invention.

REFERENCE SIGNS LIST

1 Environmental information acquisition system
2 Base station apparatus
3 Control apparatus
10 Section
11 Section
12 Section
13 Section
14 Section
15 Section
16 Section 17 Section
18 Section
19 Section
20 Bus
21 Base-station communication unit
22 Base-station storage unit
23 Base-station control unit
24 Hardware wireless processing unit
25 Software wireless processing unit
26 Wireless communication unit
30 Bus
31 Control communication unit
32 Control storage unit
33 Distribution unit
34 Accuracy information database
35 Operation information database
36 Characteristic information database
37 Generation unit, Instruction unit
38 Acquisition unit
40 Environmental information database
41 Estimation unit
42 Assignment information database
43 Assigning unit
44 Section
50 Measurable range
51 Measurement range

The invention claimed is:

1. An environmental information acquisition method executed by an environmental information acquisition apparatus for acquiring a measurement result of a radio wave environment, the method comprising:
   distributing software to base station apparatuses measuring based on the software according to radio scheme a radio wave environment of each radio scheme;
   instructing the base station apparatuses to measure the radio wave environment and, wherein in a case where frequency bands to be used for the measurement between the base station apparatuses adjacent to each other are identical, assigning a time range for the measurement to each of the base station apparatuses adjacent to each other such that the time range for the measurement is different between the base station apparatuses adjacent to each other; and
   acquiring the measurement result of the radio wave environment from the base station apparatuses measuring the radio wave environment based on the software in multiple sections set across an area.

2. The environmental information acquisition method according to claim 1, further comprising:
   based on a relation between a number of the base station apparatuses and a measuring time of the radio wave environment in case accuracy of the measurement result reaches equal to or greater than a threshold value, generating information indicating a maximum number of the base station apparatuses capable of measuring the radio wave environment and information indicating the measuring time,
   wherein, in the instructing, the base station apparatuses selected based on the information indicating the maximum number of the base station apparatuses capable of measuring the radio wave environment is instructed to measure the radio wave environment, and
   in the acquiring, the measurement result of the radio wave environment obtained over the measuring time in the multiple sections is acquired from the selected base station apparatuses.

3. The environmental information acquisition method according to claim 1, further comprising:
   estimating the radio wave environment in a section where the radio wave environment is not measured, based on time correlation or spatial correlation of the radio wave environment,
   wherein, in the acquiring, a measurement result of the radio wave environment in the section where the radio wave environment is not estimated in the estimating is acquired from the base station apparatus measuring the radio wave environment in the section.

4. The environmental information acquisition method according to claim 1, further comprising assigning preferentially a base station apparatus capable of measuring the radio wave environment for a small number of times in multiple sections where the radio wave environment is not measured to a measurement of the radio wave environment in the multiple sections.

5. The environmental information acquisition method according to claim 1 further comprising assigning preferentially a base station apparatus having a short distance from a section where the radio wave environment is not measured to a measurement of the radio wave environment in the section where the radio wave environment is not measured.

6. The environmental information acquisition method according to claim 5,
   wherein, in case a plurality of base station apparatuses having an equal distance from the section where the radio wave environment is not measured exist, a base station apparatus having a short operation time or low traffic is preferentially assigned to a measurement of the radio wave environment in the section where the radio wave environment is not measured.

7. An environmental information acquisition apparatus comprising:
   a distribution unit configured to distribute software to base station apparatuses measuring based on the software according to radio scheme a radio wave environment of each radio scheme;
   an instruction unit configured to instruct the base station apparatuses to measure the radio wave environment, wherein in a case where frequency bands to be used for the measurement between base station apparatuses adjacent to each other are identical, the instruction unit assigns a time range for the measurement to each of the base station apparatuses adjacent to each other, such that the time range for the measurement is different between the base station apparatuses adjacent to each other; and
   an acquisition unit configured to acquire the measurement result of the radio wave environment from the base station apparatuses measuring the radio wave environment based on the software in multiple sections set across an area,
   wherein each of the distribution unit, the instruction unit and the acquisition unit is implemented by:
   i) computer executable instructions executed by at least one processor,
   ii) at least one circuitry or
   iii) a combination of computer executable instructions executed by at least one processor and at least one circuitry.

8. The environmental information acquisition apparatus according to claim 7, further comprising:
   based on a relation between a number of the base station apparatuses and a measuring time of the radio wave environment in case accuracy of the measurement result reaches equal to or greater than a threshold value, a generation unit configured to generate information indicating a maximum number of the base station apparatuses capable of measuring the radio wave environment and information indicating the measuring time, wherein the instruction unit is configured to instruct the base station apparatuses selected based on the information indicating the maximum number of the base station apparatuses capable of measuring the radio wave environment, to measure the radio wave environment, and the acquisition unit is configured to acquire the measurement result of the radio wave environment obtained over the measuring time in the multiple sections from the selected base station apparatuses, wherein the generation unit is implemented by:
i) computer executable instructions executed by at least one processor,
ii) at least one circuitry or
iii) a combination of computer executable instructions executed by at least one processor and at least one circuitry.

9. The environmental information acquisition apparatus according to claim 7, further comprising:

an estimation unit configured to estimate the radio wave environment in a section where the radio wave environment is not measured based on a time correlation or spatial correlation of the radio wave environment, wherein the acquisition unit is configured to acquire a measurement result of the radio wave environment in the section where the radio wave environment is not estimated by the estimation unit from the base station apparatus measuring the radio wave environment in the section, wherein the estimation unit is implemented by:
i) computer executable instructions executed by at least one processor,
ii) at least one circuitry or
iii) a combination of computer executable instructions executed by at least one processor and at least one circuitry.

10. The environmental information acquisition apparatus according to claim 7, further comprising an assigning unit configured to assign preferentially a base station apparatus capable of measuring the radio wave environment for a small number of times in multiple sections where the radio wave environment is not measured to a measurement of the radio wave environment in the multiple sections, wherein the assigning unit is implemented by:
i) computer executable instructions executed by at least one processor,
ii) at least one circuitry or
iii) a combination of computer executable instructions executed by at least one processor and at least one circuitry.

11. The environmental information acquisition apparatus according to claim 7, further comprising an assigning unit configured to assign preferentially a base station apparatus having a short distance from a section where the radio wave environment is not measured to a measurement of the radio wave environment in the section where the radio wave environment is not measured, wherein the assigning unit is implemented by:
i) computer executable instructions executed by at least one processor,
ii) at least one circuitry or
iii) a combination of computer executable instructions executed by at least one processor and at least one circuitry.

12. The environmental information acquisition apparatus according to claim 11, wherein, in case a plurality of base station apparatuses having an equal distance from the section where the radio wave environment is not measured exist, an assigning unit assigns preferentially a base station apparatus having a short operation time or low traffic to a measurement of the radio wave environment in the section where the radio wave environment is not measured.

13. An environmental information acquisition system comprising:

base station apparatuses including a base-station control unit configured to measure a radio wave environment of a radio scheme based on software according to each radio scheme; and an environmental information acquisition apparatus including:

a distribution unit configured to distribute the software to the base station apparatus, an instruction unit configured to instruct the base station apparatuses to measure the radio wave environment, wherein in a case where frequency bands to be used for the measurement between base station apparatuses adjacent to each other are identical, the instruction unit assigns a time range for the measurement to each of the base station apparatuses adjacent to each other such that the time range for the measurement is different between the base station apparatuses adjacent to each other, and an acquisition unit configured to acquire the measurement result of the radio wave environment from the base station apparatuses measuring the radio wave environment based on the software in multiple sections set across an area.

14. The environmental information acquisition system according to claim 13, further comprising:

based on a relation between a number of the base station apparatuses and a measuring time of the radio wave environment in case accuracy of the measurement result reaches equal to or greater than a threshold value, a generation unit configured to generate information indicating a maximum number of the base station apparatuses capable of measuring the radio wave environment and information indicating the measuring time, wherein the instruction unit is configured to instruct the base station apparatuses selected based on the information indicating the maximum number of the base station apparatuses capable of measuring the radio wave environment, to measure the radio wave environment, and the acquisition unit is configured to acquire the measurement result of the radio wave environment obtained over the measuring time in the multiple sections from the selected base station apparatuses.

15. The environmental information acquisition system according to claim 13, further comprising:

an estimation unit configured to estimate the radio wave environment in a section where the radio wave environment is not measured, based on a time correlation or spatial correlation of the radio wave environment, wherein, the acquisition unit is configured to acquire a measurement result of the radio wave environment in the section where the radio wave environment is not estimated by the estimation unit from the base station apparatus measuring the radio wave environment in the section.

16. The environmental information acquisition system according to claim 13,
wherein the environmental information acquisition apparatus includes an assigning unit configured to assign preferentially a base station apparatus capable of measuring the radio wave environment for a small number of times in multiple sections where the radio wave environment is not measured to a measurement of the radio wave environment in the multiple sections.

17. The environmental information acquisition system according to claim 13,
wherein the environmental information acquisition apparatus includes an assigning unit configured to assign preferentially a base station apparatus having a short distance from a section where the radio wave environment is not measured to a measurement of the radio wave environment in the section where the radio wave environment is not measured.

18. The environmental information acquisition system according to claim 17,
wherein, in case a plurality of base station apparatuses having an equal distance from the section where the radio wave environment is not measured exist, the assigning unit preferentially assigns the base station apparatus having a short operation time or low traffic to a measurement of the radio wave environment in the section where the radio wave environment is not measured.

* * * * *